United States Patent
Saito et al.

(10) Patent No.: US 6,325,413 B2
(45) Date of Patent: *Dec. 4, 2001

(54) PASSENGER DETECTION SYSTEM

(75) Inventors: Takashi Saito, Osaka; Masahiro Ofuji, Kanagawa, both of (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,387

(22) Filed: Nov. 13, 1998

(30) Foreign Application Priority Data

Nov. 17, 1997 (JP) .................................. 9-315399

(51) Int. Cl.$^7$ .................................. B60R 21/32
(52) U.S. Cl. .............................. 280/735; 701/45
(58) Field of Search ................... 280/734, 735; 701/45, 49; 343/711

(56) References Cited

U.S. PATENT DOCUMENTS

| | | | |
|---|---|---|---|
| 4,370,658 | * | 1/1983 | Hill .................................... 343/713 |
| 5,061,939 | * | 10/1991 | Nakase ........................ 343/700 MS |
| 5,649,316 | * | 7/1997 | Prudhomme et al. ............... 455/345 |
| 5,848,802 | * | 2/1999 | Breed et al. ......................... 280/735 |
| 5,868,423 | * | 2/1999 | Takimoto et al. .................. 280/735 |
| 5,871,232 | * | 2/1999 | White .................................. 280/735 |
| 5,926,141 | * | 7/1999 | Lindenmeier et al. ............. 343/713 |
| 5,948,031 | * | 9/1999 | Jinno et al. ............................ 701/45 |
| 5,954,360 | * | 9/1999 | Griggs, III et al. ................. 280/735 |
| 5,964,478 | * | 10/1999 | Stanley et al. ...................... 280/735 |
| 5,997,033 | * | 12/1999 | Gray et al. ........................... 280/735 |
| 5,999,140 | * | 12/1999 | Johnson ............................... 343/795 |
| 6,018,693 | * | 1/2000 | Blackburn et al. ................... 701/45 |
| 6,026,340 | * | 2/2000 | Corrado et al. ....................... 701/47 |
| 6,029,105 | * | 2/2000 | Schweizer ............................. 701/45 |
| 6,043,736 | * | 3/2000 | Sawahata et al. .................. 340/438 |
| 6,043,743 | * | 2/1999 | Saito et al. ......................... 340/562 |
| 6,144,343 | * | 11/2000 | Furuya et al. ...................... 343/713 |

FOREIGN PATENT DOCUMENTS 9-42650   2/1997  (JP) .

* cited by examiner

Primary Examiner—Eric Culbreth
Assistant Examiner—L. Lum
(74) Attorney, Agent, or Firm—Sughrue, Mion, Zinn, Macpeak & Seas, PLLC

(57) ABSTRACT

A passenger detection system comprises an antenna electrode which is provided to the dashboard of a car, an oscillation circuit for generating a high frequency low voltage oscillation signal in order to generate a weak alternating electric field around the antenna electrode, a current detection section for detecting a transmission current which passes between the oscillation circuit and the antenna electrode depending on the weak alternating electric field which is generated around the antenna electrode, a phase difference detection section for detecting the phase difference between the oscillation signal supplied from the oscillation circuit and an output signal which is supplied to the antenna electrode, and a control circuit for judging the presence or absence of a passenger seated on the seat based on the detected phase difference and judging the distance between the passenger and the dashboard based on the detected transmission current. The passenger detection system is connected with an air bag unit, and the air bag unit is set at a 'no deployment mode' if it is judged that no passenger is seated on the seat or the distance between the passenger and the dashboard is less than a minimum allowable distance, thereby the passenger who is close to the dashboard is protected from secondary injury due to strong deployment of the air bag.

25 Claims, 17 Drawing Sheets

F I G. 11
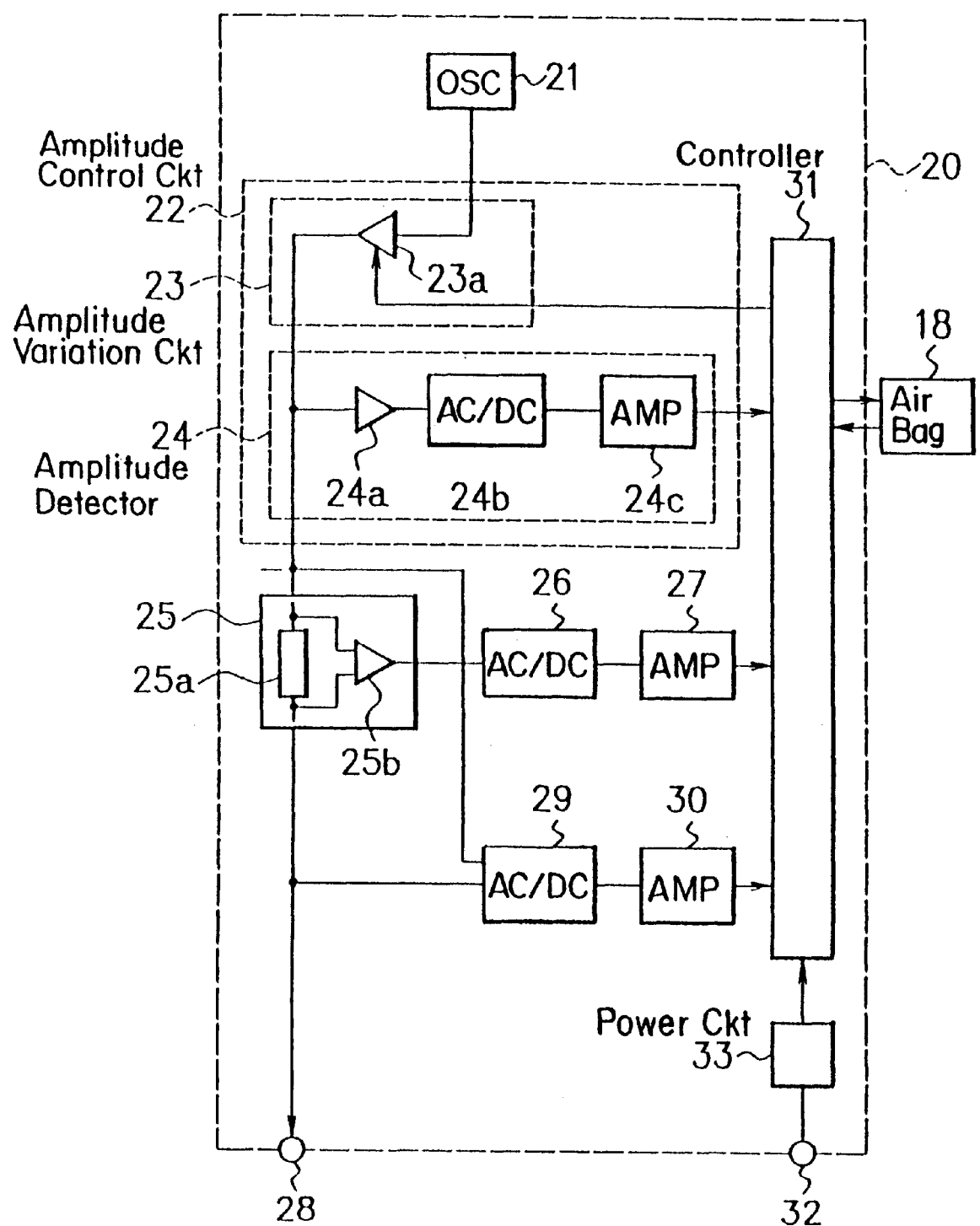

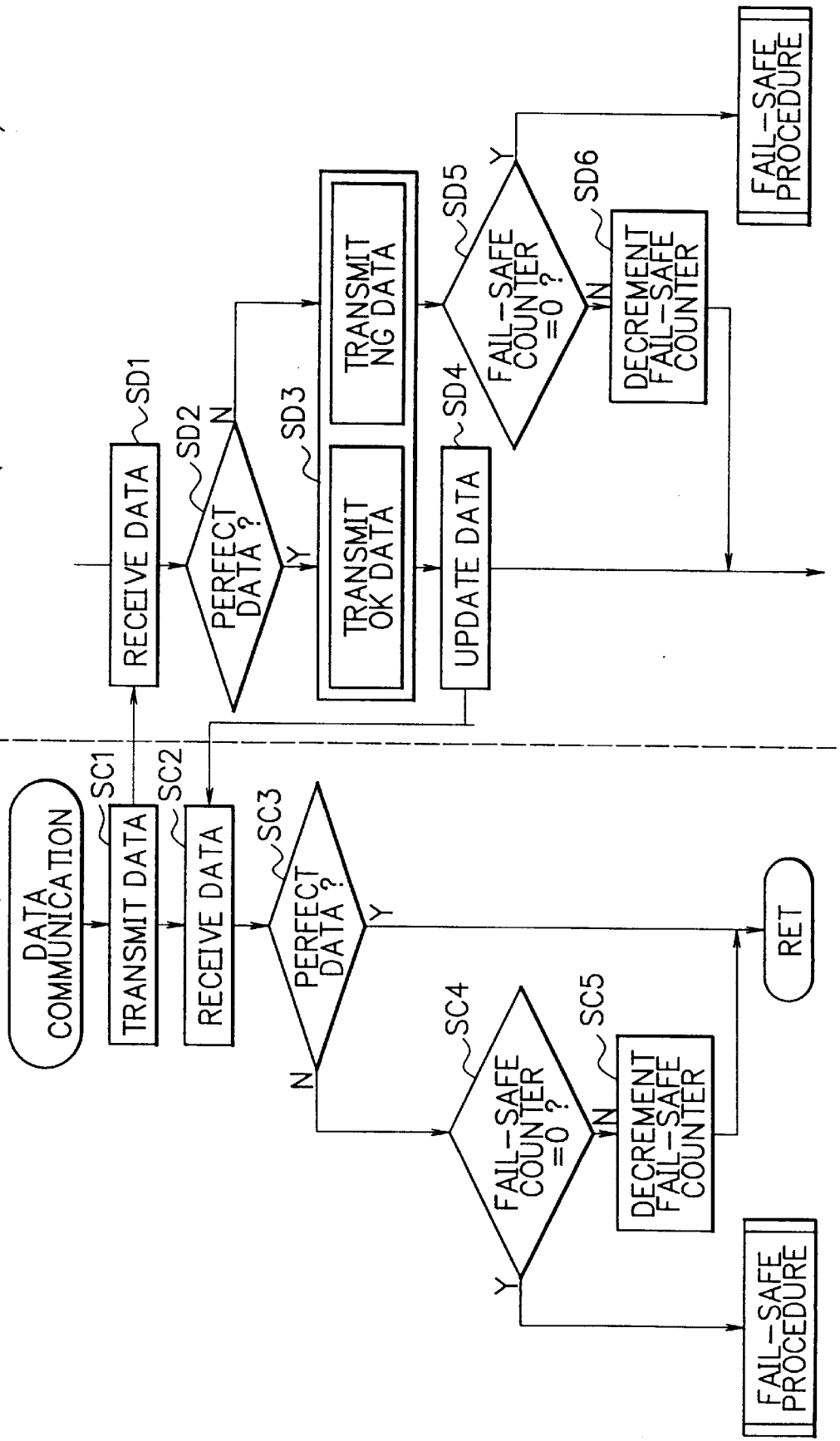

PASSENGER DETECTION SYSTEM

BACKGROUND OF THE INVENTION

The present invention relates to a system and a method for detecting a passenger seated on a seat of a vehicle, and in particular, to a passenger detection system and a passenger detection method which can also protect the passenger from injury due to deployment of an air bag when the upper body of the passenger is close to the dashboard.

1. Description of the Prior Art

Air bag units for absorbing shocks and providing relief from impact damage of car passengers in cases of collisions have become indispensable gear for car safety, and are being provided not only to driver's seats but also to passenger seats in recent years.

FIG. 1 is a circuit diagram showing a conventional circuit employed in air bag systems. The circuit of FIG. 1 comprises a driver's seat squib circuit composed of a series connection of a safety sensor SS1 such as a mechanical accelerometer, a squib SQ1, and a semiconductor switching device SW1 such as an FET (Field-Effect Transistor), and a passenger seat squib circuit composed of a series connection of a safety sensor SS2, a squib SQ2, and a semiconductor switching device SW2 such as an FET, and an electronic accelerometer (collision sensor) AM for detecting negative acceleration due to collisions, and a control circuit CC provided with functions for judging the presence or absence of a collision according to an output signal of the electronic accelerometer AM and supplying signals to the gates of the semiconductor switching devices SW1 and SW2.

When a car provided with the air bag system collided with something, switches of the safety sensors SS1 and SS2 are closed with relatively small negative acceleration enabling the driver's seat squib circuit and the passenger seat squib circuit. If the control circuit CC judged that the car actually collided with something according to the output signal from the electronic accelerometer AM, the control circuit CC supplies signal to the gates of the semiconductor switching devices SW1 and SW2 and the semiconductor switching devices SW1 and SW2 are turned ON, thereby currents are passed through the two squib circuits. Due to the currents, the squibs SQ1 and SQ2 are heated and thereby the air bags for the driver's seat and the passenger seat are deployed to protect the passengers from impact damage by the collision.

Incidentally, such an air bag system is effective for saving the passenger in the case where an adult person P is seated on the seat 1 as shown in FIG. 2A. However, in the case where an infant SP is seated on an infant seat 1A fixed on the passenger seat facing rear (hereafter referred to as 'RFIS (Rear Facing Infant Seat)' as shown in FIG. 2B, deployment of the air bag might hurt the infant, and thus it is preferable that the air bag does not deploy on the collision. Further, in the case where a child SP' is seated on a child seat 1A' fixed on the passenger seat facing forward (hereafter referred to as 'FFCS (Forward Facing Child Seat)' as shown in FIG. 2C, deployed air bag might cover the face of the child SP' and suffocate the child SP', and thus it is preferable that the air bag does not deploy on the collision similarly to the case of RFIS.

As a countermeasure against the above problems, a circuit for air bag systems shown in FIG. 3 has been proposed, for example. The circuit of FIG. 3 further comprises a passenger detection sensor device SD for detecting the status of the passenger on the passenger seat. The control circuit CC judges whether or not a passenger is seated on the passenger seat and the status of the passenger on the passenger seat, according to a detection signal from the passenger detection sensor device SD, and sets itself at a deployment mode in which the control circuit CC deploys the air bag on collision, or at a no deployment mode in which the control circuit CC does not deploy the air bag on collision. As the passenger detection sensor device SD, a device employing a weight sensor and a device employing image processing have been proposed. In the method employing image processing, the passenger is shot by a camera and it is judged whether the passenger is an adult person P or a child SP' or an infant SP by means of image processing.

By the first method employing a weight sensor, whether the passenger is an adult P or a child SP' or an infant SP can roughly be judged and the above unexpected accidents can basically be avoided by the setting of the control circuit CC into the deployment mode or the no deployment mode based on the judgment. However, such a method employing a weight sensor lacks precision since weight varies widely among individuals and there exist cases where a child SP' weighs more than a very thin adult person P. Further, it is impossible to judge whether the status of a little child on the passenger seat is RFIS or FFCS.

By the second method employing image processing, it is possible to judge rather precisely whether or not a passenger is seated on the passenger seat, whether the passenger is an adult P or a child SP' or an infant SP, and whether the status of a little child on the passenger seat is RFIS or FFCS. However, image processing and pattern matching against various kinds of patterns have to be executed to image data obtained by a camera, and thus complex and expensive image processing device is needed.

2. Description of the Related Art

In order to resolve the above problems, the present inventors have lately proposed a passenger detection system shown in FIG. 4A through FIG. 8 (Japanese Patent Application No.HEI9-42650). The system utilizes disturbance in a weak alternating electric field which is generated between two electrodes placed on a seat. Referring to FIG. 4A, an oscillator for generating high frequency low voltage is connected to an electrode E1, and another electrode E2 is grounded. An alternating electric field is generated between the electrodes E1 and E2 according to the potential difference between the electrodes E1 and E2, thereby a displacement current Id occurs between the electrode E2 and the ground. In this situation, if an object OB is placed in the electric field as shown in FIG. 4B, the electric field is disturbed by the object OB and thereby the displacement current Id varies into Id1. Almost every object OB can be represented by a conductance and a capacitance, and the object OB is regarded to be connected to the ground via the capacitance.

As shown above, the displacement current varies depending on whether or not an object OB exists on a seat of a car, and the status of a passenger on the seat can be detected by utilizing the phenomenon. Especially, a lot of information about an object on the seat including a passenger can be obtained by increasing the number of electrodes which are placed on the seat, thereby precise detection of the situation on the seat can be executed.

In the following, a concrete example of a passenger detection system utilizing the phenomenon will be described referring to FIG. 5 through FIG. 8. FIG. 5 is a perspective view of a passenger seat which is provided with the passenger detection system which has been proposed by the present inventors. A plurality of electrodes are placed on the upper side of the passenger seat 1. Concretely, electrodes E1 and E2 of quadrangular shapes for example are placed apart on the cushion section 1a, and electrodes E3 and E4 of almost the same shapes are placed apart on the back section 1b. The electrodes E1~E4 are formed of electrically conductive fabrics in consideration of comfort of the passenger. However the electrodes E1~E4 can also be formed by weaving stringy metal in fabric which covers the seat, by applying electrically conductive paint on fabric which covers the seat, etc., or it is also possible to form the electrodes E1~E4 by metal plates. The electrodes E1~E4 are connected to a circuit which is shown in FIG. 6 and FIG. 7.

Referring to FIG. 6, the passenger detection system comprises an oscillator circuit 10 for generating high frequency low voltage (for example, 100 Khz and 10~12V), a loading current detection circuit 11, a transmission/reception switching circuit 12, a current-voltage converter circuit 13 provided with amplification capability, a detection circuit (demodulation circuit) 14 provided with band passing (unnecessary noise reduction) capability and AC-DC converting capability, an amplification circuit 15, an offset switching circuit 16, and a control circuit 17 such as an MPU which is connected with an air bag unit 18.

FIG. 7 is a circuit diagram showing more concrete details of FIG. 6. In the passenger detection system of FIG. 6 and FIG. 7, the amplification circuit 15 is composed of a first amplification circuit 15A whose gain is ×1 and a second amplification circuit 15B whose gain is ×100, and an analog selection circuit 19 is provided for selecting one of the outputs of the first and the second amplification circuits 15A and 15B according to control of the control circuit 17.

The loading current detection circuit 11 is, for example, composed of an impedance device such as a resistor 11a which is inserted to the circuit in series and an amplifier 11b for amplifying the terminal voltage of the resistor 11a, and a current supplied from the oscillator circuit 10 to a particular selected electrode (i.e. the loading current) is detected by the loading current detection circuit 11. The transmission/reception switching circuit 12 is composed of, for example, switching means Aa~Ad for connecting the output of the oscillator circuit 10 to an electrode which is selected out of the electrodes E1~E4 (hereafter referred to as a 'transmission electrode') and switching means Ba~Bd for connecting electrodes other than the transmission electrode (hereafter referred to as 'reception electrodes') to the current-voltage converter circuit 13, in which switching of the switching means Aa~Ad and Ba~Bd is controlled by the control circuit 17. Incidentally, it is preferable that the transmission/reception switching circuit 12 is composed of a multiplexer circuit. The current-voltage converter circuit 13 is composed of, for example, impedance devices such as resistors 13a or converting the displacement current passing through the reception electrodes into voltages and amplifiers 13b for amplifying the converted voltages, in which a resistor 13a and an amplifier 13b are provided corresponding to each of the electrodes E1~E4. The analog selection circuit 19 is composed of, for example, four switching means 19a for being switched simultaneously and connecting the outputs of the second amplification circuit 15B to the control circuit 17 and four switching means 19b for being switched simultaneously and connecting the outputs of the first amplification circuit 15A to the control circuit 17.

FIG. 8 is a circuit diagram showing an example of a circuit which is employed in the air bag unit 18. The circuit of FIG. 8 is basically the same as the circuits of FIG. 1 and FIG. 3, except that the control circuit CC is connected with the control circuit 17 of the circuit of FIG. 6 and FIG. 7.

In the following, the operation of the passenger detection system of FIG. 4A through FIG. 8 will be described. First, according to signals from the control circuit 17, only the switching means Aa in the transmission/reception switching circuit 12 is closed in order to connect the output of the oscillator circuit 10 to the electrode E1, and the switching means Bb~Bd are closed in order to connect the electrodes E2~E4 to the current-voltage converter circuit 13. Thus, the high frequency low voltage is applied to the transmission electrode E1 by the oscillator circuit 10, and thereby the displacement currents occurs in the reception electrodes E2~E4. The displacement currents of the reception electrodes E2~E4 are converted into voltages by the resistors 13a and amplified by the amplifiers 13b, and the amplified voltages are supplied to the detection circuit 14. Meanwhile, the loading current passing through the transmission electrode E1 is detected by the loading current detection circuit 11, and the result is supplied to the detection circuit 14 as data R(1,1) which will be explained later. In the detection circuit (demodulation circuit) 14, signal components of the amplified voltages around 100 KHz for example are band passed and unnecessary noise components are rejected, and output signals of the detection circuit 14 are supplied to the first and the second amplification circuits 15A and 15B. Signals from one of the amplification circuits 15A and 15B are properly selected by the operation of the offset switching circuit 16 and the analog selection circuit 19, and the selected signals are supplied to the control circuit 17. For example, when the output signals from the detection circuit 14 can be measured using full-range of the control circuit 17, only the four switching means 19b are simultaneously closed in order to supply the output signals of the first amplification circuit 15A (×1) to the control circuit 17. On the other hand, when the output signals from the detection circuit 14 are so small that subtle variations of the output signals can not be measured using full-range of the control circuit 17, only the four switching means 19a are simultaneously closed in order to supply the output signals of the second amplification circuit 15B (×100) to the control circuit 17. In the control circuit 17, output signals from the amplification circuit 15A or 15B are A/D converted and stored in memory.

Subsequently, according to signals from the control circuit 17, only the switching means Ab in the transmission/reception switching circuit 12 is closed in order to connect the output of the oscillator circuit 10 to the electrode E2, and the switching means Ba, Bc and Bd are closed in order to connect the electrodes E1, E3 and E4 to the current-voltage converter circuit 13. Thus, the high frequency low voltage is applied to the transmission electrode E2 by the oscillator circuit 10, and thereby the displacement currents occurs in the reception electrodes E1, E3 and E4. The displacement currents of the reception electrodes E1, E3 and E4 are converted into voltages by the resistors 13a and amplified by the amplifiers 13b, and the amplified voltages are supplied to the detection circuit 14. Meanwhile, the loading current passing through the transmission electrode E2 is detected by the loading current detection circuit 11, and the result is supplied to the detection circuit 14 as data R(2,2) which will be explained later. Output signals from the detection circuit 14 are processed in the same way as above and the processed data are stored in memory of the control circuit 17.

Subsequently, only the switching means Ac is closed in order to connect the output of the oscillator circuit 10 to the electrode E3, and the switching means Ba, Bb and Bd are closed in order to connect the electrodes E1, E2 and E4 to the current-voltage converter circuit 13. Thus, the high frequency low voltage is applied to the transmission electrode E3 by the oscillator circuit 10, and thereby the displacement currents occur in the reception electrodes E1, E2 and E4. The displacement currents of the reception electrodes E1, E2 and E4 are converted into voltages by the resistors 13a and amplified by the amplifiers 13b, and the amplified voltages are supplied to the detection circuit 14. Meanwhile, the loading current passing through the transmission electrode E3 is detected by the loading current detection circuit 11, and the result is supplied to the detection circuit 14 as data R(3,3) which will be explained later. Output signals from the detection circuit 14 are processed in the same way as above and the processed data are stored in memory of the control circuit 17.

Subsequently, only the switching means Ad is closed in order to connect the output of the oscillator circuit 10 to the electrode E4, and the switching means Ba, Bb and Bc are closed in order to connect the electrodes E1, E2 and E3 to the current-voltage converter circuit 13. Thus, the high frequency low voltage is applied to the transmission electrode E4 by the oscillator circuit 10, and thereby the displacement currents occurs in the reception electrodes E1, E2 and E3. The displacement currents of the reception electrodes E1, E2 and E3 are converted into voltages by the resistors 13a and amplified by the amplifiers 13b, and the amplified voltages are supplied to the detection circuit 14. Meanwhile, the loading current passing through the transmission electrode E4 is detected by the loading current detection circuit 11, and the result is supplied to the detection circuit 14 as data R(4,4) which will be explained later. Output signals from the detection circuit 14 are processed in the same way as above and the processed data are stored in memory of the control circuit 17.

Then, the control circuit 17 calculates the seating pattern on the passenger seat 1 by executing arithmetic logic operation to the data. Various types of seating patterns are prestored in the control circuit 17, and a seating pattern which has been calculated using various combinations of a transmission electrode and reception electrodes chosen from the electrodes E1~E4 is compared with the prestored seating patterns and one or more matched seating patterns are extracted from the prestored seating patterns in order to judge the status of the passenger on the passenger seat 1. The control circuit 17 regards the following typical seating patterns as objects of matching, for example, a 'vacant seat pattern' in which no passenger is seated on the passenger seat 1, a 'FFCS pattern' in which a child is seated on the passenger seat 1 in FFCS, a 'RFIS pattern' in which an infant is seated on the passenger seat 1 in RFIS, and a 'person pattern' in which an adult person is seated on the passenger seat 1. By various combinations of a transmission electrode and reception electrodes chosen from the electrodes E1~E4, a plurality of data which are generally represented as R(i, j) can be obtained. Here, R(i, j) in which i=j is transmission data, and R(i, j) in which i≠j is reception data in which i and j are representing a transmission electrode and a reception electrode respectively. The control circuit 17 executes arithmetic logic operation using 16 pieces of data R(i, j) for example, and extracts characteristics of the seating pattern.

Then, a signal according to the seating pattern determined by the control circuit 17 is transmitted by the control circuit 17 to the air bag unit 18. For example, a signal instructing the air bag unit 18 to set itself at the no deployment mode (in which the air bag unit 18 does not deploy the air bag for the passenger seat 1 on collision) is transmitted by the control circuit 17 in the case where the determined seating pattern is the vacant seat pattern, the FFCS pattern, or the RFIS pattern, and a signal instructing the air bag unit 18 to set itself at the deployment mode (in which the air bag unit 18 deploys the air bag for the passenger seat 1 on collision) is transmitted by the control circuit 17 in the case where the determined seating pattern is other than the above patterns. These signals are received by the control circuit CC of the air bag unit 18, and in the former case, the control circuit CC is set not to supply a gate signal to the semiconductor switching device SW2 on the side of the passenger seat 1 on collision. Incidentally, the semiconductor switching device SW1 on the side of the driver's seat is necessarily supplied with a gate signal on collision. In the latter case, the control circuit CC is set to supply gate signals to the semiconductor switching devices SW1 and SW2 on collision.

According to the above passenger detection system, a plurality of electrodes E1~E4 are placed on the upper side of the passenger seat 1 and weak alternating electric field due to high frequency low voltage applied between a selected transmission electrode and other reception electrodes is generated, and displacement currents depending on a seating pattern of the passenger on the passenger seat 1 pass through the reception electrodes. Therefore, the seating pattern of the passenger on the passenger seat 1 can be correctly detected by analyzing characteristic patterns in the displacement currents, and thereby the air bag unit 18 can be set at the no deployment mode or the deployment mode according to the seating pattern of the passenger on the passenger seat 1.

Further, the number of the electrodes placed on the passenger seat 1 can be arbitrarily increased and the number of combinations of transmission electrodes and reception electrodes can be increased in order to increase obtained data and execute more precise judgment of the seating pattern of the passenger on the passenger seat 1.

Furthermore, a large number of displacement current patterns corresponding to the 'empty pattern', the 'RFIS pattern', the 'FFCS pattern', 'person pattern', etc. corresponding to each combination of the transmission electrode and the reception electrodes can be stored in the control circuit 17 as the seating patterns. Therefore, actual seating pattern can be detected precisely by use of various combinations of transmission electrodes and reception electrodes and extracting a most probable seating pattern by executing pattern matching.

However, these days, some accidents occurring to passengers on cars provided with air bag systems have been reported. In such accidents, when a car collided with something, a passenger seated on the passenger seat gets hurt on the face etc. even if the air bag could successively be deployed.

FIG. 9 is a schematic diagram explaining the accidents occurring to passengers seated on the passenger seats. Referring to FIG. 9, in the case where the air bag deployed due to a crash when the upper body (especially, the face) of the passenger P is very close (20 cm, for example)to the dashboard DB, the passenger P gets strong impact on the face by the rapidly expanding air bag, and is punched back strongly to the back section of the passenger seat, therefore, there is a possibility that the passenger gets hurt on the face, head, neck, etc.

Therefore, these days, the passenger detection system is being required capability of protecting the passenger from injury due to deployment of the air bag even when the upper body of the passenger is close to the dashboard, as well as the capability of correctly detecting whether or not a passenger is seated on the seat.

SUMMARY OF THE INVENTION

It is therefore the primary object of the present invention to provide a passenger detection system and a passenger detection method, by which the distance between the dashboard and the passenger seated on the seat can also be detected correctly and the deployment of the air bag can be appropriately controlled according to the detection, and thereby the passenger can be protected from injury due to deployment of the air bag.

In accordance with a first aspect of the present invention, there is provided a passenger detection system comprising an antenna electrode, an oscillation means, a current detection means and a judgment means. The antenna electrode is provided to a portion of a vehicle in front of a seat of the vehicle so as to face a passenger seated on the seat. The oscillation means generates a high frequency low voltage oscillation signal in order to generate a weak alternating electric field around the antenna electrode. The current detection means detects a transmission current which passes between the oscillation means and the antenna electrode depending on the weak alternating electric field which is generated around the antenna electrode. And the judgment means judges the distance between the passenger and the portion of the vehicle based on the transmission current which has been detected by the current detection means.

In accordance with a second aspect of the present invention, in the first aspect, the passenger detection system is connected with an air bag unit which is capable of deploying an air bag in front of the passenger in case of collision so that data concerning the distance judged by the judgment means can be sent to the air bag unit, and the air bag unit is set at a deployment mode in which the air bag unit deploys the air bag on collision or a no deployment mode in which the air bag unit does not deploy the air bag on collision according to the data concerning the distance sent from the judgment means.

In accordance with a third aspect of the present invention, in the second aspect, the judgment means executes judgment on whether the distance between the passenger and the portion of the vehicle is more than a minimum allowable distance or less than the minimum allowable distance by comparing the transmission current detected by the current detection means with a prestored threshold value concerning the transmission current corresponding to the minimum allowable distance, and the air bag unit is set at the no deployment mode if the distance is judged to be less than the minimum allowable distance.

In accordance with a fourth aspect of the present invention, in the third aspect, the antenna electrode is provided to the dashboard of a car.

In accordance with a fifth aspect of the present invention, in the fourth aspect, a control unit is made up by enclosing the oscillation means, the current detection means and the judgment means in a common housing, and the control unit is placed inside or near the dashboard.

In accordance with a sixth aspect of the present invention, in the first aspect, the antenna electrode is provided so that the area of the antenna electrode facing part of the passenger will be as large as possible.

In accordance with a seventh aspect of the present invention, in the first aspect, the passenger detection system further comprises an amplitude control means for controlling the voltage amplitude of the oscillation signal which is supplied by the oscillation means to the antenna electrode at an almost constant value.

In accordance with an eighth aspect of the present invention, in the first aspect, the passenger detection system further comprises a power circuit for generating a single uniform DC voltage utilizing power derived from a battery. The single uniform DC voltage supplied by the power circuit is utilized as the system power source for circuits in the passenger detection system including the oscillation means, the current detection means and the judgment means.

In accordance with a ninth aspect of the present invention, there is provided a passenger detection system comprising an antenna electrode, an oscillation means, a current detection means, a phase difference detection means and a judgment means. The antenna electrode is provided to a portion of a vehicle in front of a seat of the vehicle so as to face a passenger seated on the seat. The oscillation means generates a high frequency low voltage oscillation signal in order to generate a weak alternating electric field around the antenna electrode. The current detection means detects a transmission current which passes between the oscillation means and the antenna electrode depending on the weak alternating electric field which is generated around the antenna electrode. The phase difference detection means detects the phase difference between the oscillation signal supplied from the oscillation means and an output signal which is supplied to the antenna electrode. And the judgment means judges the presence or absence of a passenger seated on the seat based on the phase difference which has been detected by the phase difference detection means, and judges the distance between the passenger and the portion of the vehicle based on the transmission current which has been detected by the current detection means.

In accordance with a tenth aspect of the present invention, in the ninth aspect, the passenger detection system is connected with an air bag unit which is capable of deploying an air bag in front of the passenger in case of collision so that data concerning the judgment can be sent from the passenger detection system to the air bag unit, and the air bag unit is set at a deployment mode in which the air bag unit deploys the air bag on collision or a no deployment mode in which the air bag unit does not deploy the air bag on collision according to the data concerning the judgment sent from the judgment means.

In accordance with an eleventh aspect of the present invention, in the tenth aspect, the judgment means executes judgment on the presence or absence of a passenger seated on the seat by comparing the phase difference detected by the phase difference detection means with a prestored threshold value concerning the phase difference and executes judgment on whether the distance between the passenger and the portion of the vehicle is more than a minimum allowable distance or less than the minimum allowable distance by comparing the transmission current detected by the current detection means with another prestored threshold value concerning the transmission current corresponding to the minimum allowable distance, and the air bag unit is set at the no deployment mode if it is judged that no passenger is seated on the seat or the distance is less than the minimum allowable distance.

In accordance with a twelfth aspect of the present invention, in the eleventh aspect, the antenna electrode is provided to the dashboard of a car.

In accordance with a thirteenth aspect of the present invention, in the twelfth aspect, a control unit is made up by enclosing the oscillation means, the current detection means, the phase difference detection means and the judgment means in a common housing, and the control unit is placed inside or near the dashboard.

In accordance with a fourteenth aspect of the present invention, in the ninth aspect, the antenna electrode is provided so that the area of the antenna electrode facing part of the passenger will be as large as possible.

In accordance with a fifteenth aspect of the present invention, in the ninth aspect, the passenger detection system further comprises an amplitude control means for controlling the voltage amplitude of the oscillation signal which is supplied by the oscillation means to the antenna electrode at an almost constant value.

In accordance with a sixteenth aspect of the present invention, in the ninth aspect, the passenger detection system further comprises a power circuit for generating a single uniform DC voltage utilizing power derived from a battery. The single uniform DC voltage supplied by the power circuit is utilized as the system power source for circuits in the passenger detection system including the oscillation means, the current detection means, the phase difference detection means and the judgment means.

In accordance with a seventeenth aspect of the present invention, in the ninth aspect, the phase difference detection means detects the phase difference between signals at both ends of the current detection means.

In accordance with an eighteenth aspect of the present invention, in the ninth aspect, the phase difference detection means detects the phase difference between the oscillation signal and the output signal, by detecting the phase difference between a rising/falling edge of a square wave signal corresponding to the oscillation signal and a rising/falling edge of a square wave signal corresponding to the output signal.

In accordance with a nineteenth aspect of the present invention, in the ninth aspect, the oscillation means generates the high frequency low voltage oscillation signal substantially in the form of a square wave.

In accordance with a twentieth aspect of the present invention, in the nineteenth aspect, an MPU (MicroProcessor Unit) is utilized as the oscillation means for generating the high frequency low voltage oscillation signal in the form of a square wave.

In accordance with a twenty-first aspect of the present invention, there is provided a passenger detection method comprising the steps of a field generation step, a transmission current detection step and a judgment step. In the field generation step, a weak alternating electric field is generated by an oscillation means around an antenna electrode which is provided to a portion of a vehicle in front of a seat of the vehicle so as to face a passenger seated on the seat. In the transmission current detection step, a transmission current which passes in the antenna electrode depending on the weak alternating electric field is detected. And in the judgment step, the distance between the passenger and the portion of the vehicle is judged based on the transmission current which has been detected in the transmission current detection step.

In accordance with a twenty-second aspect of the present invention, in the twenty-first aspect, the passenger detection method further comprises the steps of a data communication step and an air bag unit setting step. In the data communication step, data concerning the judgment on the distance is sent to an air bag unit. And in the air bag unit setting step, the air bag unit is set at a deployment mode in which the air bag unit deploys the air bag on collision or a no deployment mode in which the air bag unit does not deploy the air bag on collision according to the data concerning the judgment on the distance.

In accordance with a twenty-third aspect of the present invention, in the twenty-second aspect, in the judgment step, whether the distance between the passenger and the portion of the vehicle is more than a minimum allowable distance or less than the minimum allowable distance is judged by comparing the transmission current detected in the transmission current detection step with a threshold value concerning the transmission current corresponding to the minimum allowable distance. And in the air bag unit setting step, the air bag unit is set at the no deployment mode if the distance is judged to be less than the minimum allowable distance.

In accordance with a twenty-fourth aspect of the present invention, in the twenty-third aspect, the antenna electrode is provided to the dashboard of a car.

In accordance with a twenty-fifth aspect of the present invention, there is provided a passenger detection method comprising the steps of a field generation step, a transmission current detection step, a phase difference detection step and a judgment step. In the field generation step, a weak alternating electric field is generated by an oscillation means around an antenna electrode which is provided to a portion of a vehicle in front of a seat of the vehicle so as to face a passenger seated on the seat. In the transmission current detection step, a transmission current which passes in the antenna electrode depending on the weak alternating electric field is detected. In the phase difference detection step, the phase difference between an oscillation signal which is supplied from the oscillation means and an output signal which is supplied to the antenna electrode is detected. And in the judgment step, the presence or absence of a passenger seated on the seat is judged based on the phase difference which has been detected in the phase difference detection step, and the distance between the passenger and the portion of the vehicle is judged based on the transmission current which has been detected in the transmission current detection step.

In accordance with a twenty-sixth aspect of the present invention, in the twenty-fifth aspect, the passenger detection method further comprises the steps of a data communication step and an air bag unit setting step. In the data communication step, data concerning the judgment in the judgment step is sent to an air bag unit. And in the air bag unit setting step, the air bag unit is set at a deployment mode in which the air bag unit deploys the air bag on collision or a no deployment mode in which the air bag unit does not deploy the air bag on collision according to the data concerning the judgment.

In accordance with a twenty-seventh aspect of the present invention, in the twenty-sixth aspect, in the judgment step, the presence or absence of a passenger seated on the seat is judged by comparing the phase difference detected in the phase difference detection step with a prestored threshold value concerning the phase difference and whether the distance between the passenger and the portion of the vehicle is more than a minimum allowable distance or less than the minimum allowable distance is judged by comparing the transmission current detected in the transmission current detection step with another threshold value concerning the transmission current corresponding to the minimum allowable distance. And in the air bag unit setting step, the air bag unit is set at the no deployment mode if it is judged that no passenger is seated on the seat or the distance is less than the minimum allowable distance.

In accordance with a twenty-eighth aspect of the present invention, in the twenty-seventh aspect, the antenna electrode is provided to the dashboard of a car.

In accordance with a twenty-ninth aspect of the present invention, in the twenty-fifth aspect, in the phase difference detection step, the phase difference between the oscillation signal and the output signal is detected by detecting the phase difference between a rising/falling edge of a square wave signal corresponding to the oscillation signal and a rising/falling edge of a square wave signal corresponding to the output signal.

In accordance with a thirtieth aspect of the present invention, in the twenty-fifth aspect, the oscillation means generates a high frequency low voltage square wave oscillation signal in order to generate the weak alternating electric field.

In accordance with a thirty-first aspect of the present invention, in the thirtieth aspect, an MPU (MicroProcessor Unit) is utilized as the oscillation means for generating the high frequency low voltage square wave oscillation signal.

BRIEF DESCRIPTION OF THE DRAWINGS

The objects and features of the present invention will become more apparent from the consideration of the following detailed description taken in conjunction with the accompanying drawings, in which:

FIG. 11 is a block diagram showing an example of a control unit of he passenger detection system of the embodiment;

FIG. 21 is a flow chart showing an example of a data communication step in FIG. 18.

DESCRIPTION OF THE PREFERRED EMBODIMENTS

Figure 1:
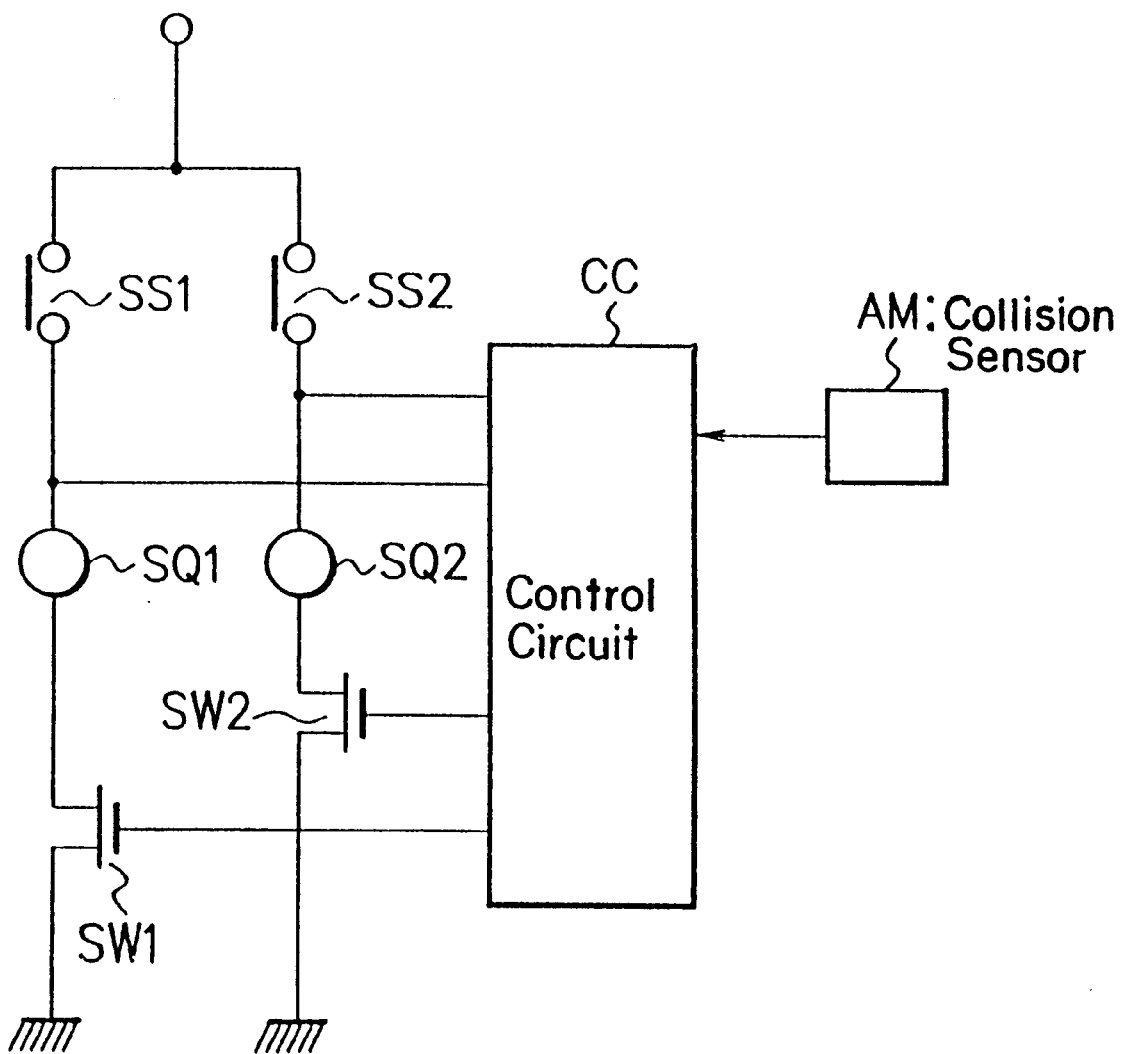
FIG. 1 is a circuit diagram showing a conventional circuit employed in air bag systems.

Referring now to the drawings, a description will be given in detail of preferred embodiments in accordance with the present invention.

The passenger detection system according to the present invention utilizes disturbance in a weak alternating electric field which is generated around an antenna electrode, similarly to the passenger detection system which has been proposed by the present inventors in Japanese Patent Application No.HEI9-42650 and has been shown in FIG. 4A through FIG. 8. Concretely, in the passenger detection system according to the present invention, a weak electric field is generated around an antenna electrode which is provided to the dashboard which is facing the seat, and the distance between the dashboard and the passenger seated on the seat is detected based on a transmission current which passes the antenna electrode and a phase difference between an oscillation signal and an output signal, in which the transmission current and the phase difference varies depending on the electrical characteristic of a substance which is placed around the antenna electrode. Therefore, the passenger detection system of the present invention is a little different from the passenger detection system which has been proposed in Japanese Patent Application No.HEI9-42650 by the present inventors.

Figure 10A:
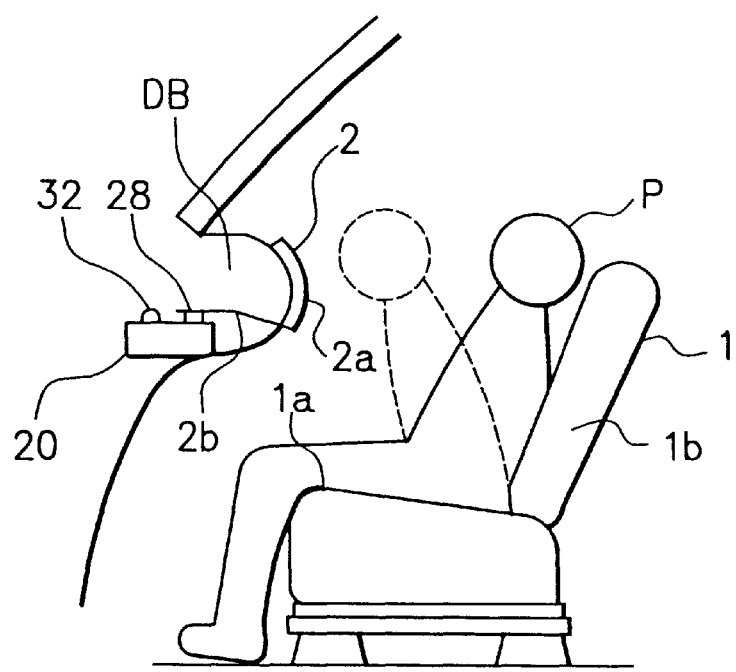
FIG. 10A is a schematic diagram showing installation of the passenger detection system according an embodiment of the present invention in a car.

FIG. 10A is a schematic diagram showing installation of the passenger detection system according an embodiment of the present invention in a car. Referring to FIG. 10A, the seat 1 on which the passenger P is seated is mainly composed of a cushion section 1a and a back section 1b. An antenna electrode 2 of the passenger detection system is provided to the dashboard DB which is facing the passenger P seated on the seat 1.

Figure 10B:
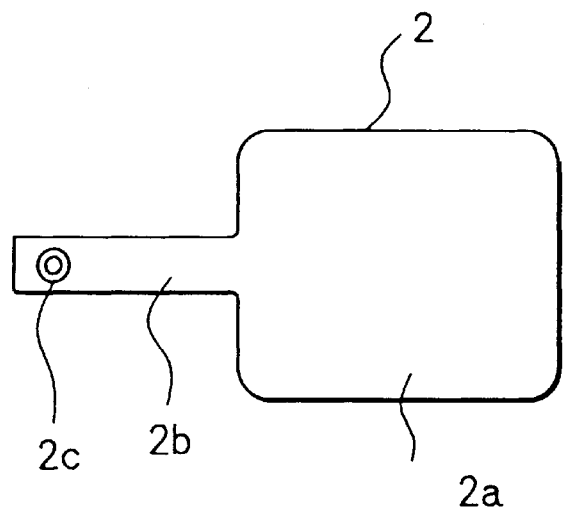
FIG. 10B is a plan view of an antenna electrode which is provided to the cushion section of the seat of FIG. 9.

FIG. 10B is a plan view showing an example of the antenna electrode 2. The antenna electrode 2 shown in FIG. 10B is composed of an antenna section 2a which is provided to the dashboard DB so as to face the passenger, a conduction section 2b which is formed by extending the antenna section 2a with a width narrower than the antenna section 2a, and a snap (socket and ball) type connector 2c which is fixed to the end of the conduction section 2b keeping electrical connection with the conduction section 2b. The conduction section 2b of the antenna electrode 2 is led inside the dashboard DB, and the connector 2c on the end of the conduction section 2b is connected to a connector 28 of the control unit 20 which will be described later. Incidentally, while the conduction section 2b shown in FIG. 10B is formed of the same material as the antenna section 2a by extending the antenna section 2a, the conduction section 2b can also be formed independently of the antenna section 2a by wire harness such as a shielded wire etc. In such cases, it is preferable that a connector or a connection terminal is provided to the antenna section 2a so that the wire harness can easily be connected to the antenna section 2a. In addition, the connectors 2c and 28 can be formed in other types than the snap (socket and ball) type, such as pin type, plug-jack type, etc.

For example, the antenna electrode 2 shown in FIG. 10A is formed of electrically conductive fabric and is stuck on the dashboard DB. It is also possible to embed the antenna section 2a of the antenna electrode 2 which is formed of electrically conductive fabric or a metal plate in the dashboard DB which is composed of plastic etc. For instance, the dashboard can be molded with the antenna section 2a of the antenna electrode 2 inserted therein. Further, it is also possible to form part of the dashboard DB (to which the antenna section 2a should be placed) by electrically conductive plastic by molding plastic and electrically conductive powder mixed together. Or, the antenna section 2a can be formed on the dashboard DB by applying electrically conductive paint on the dashboard DB. Especially, the antenna section 2a of the antenna electrode 2 is provided to the dashboard DB so that the area of the antenna section 2a facing part (especially, the face) of the passenger P will be as large as possible.

The aforementioned control unit 20 is placed inside or near the dashboard DB. FIG. 11 is a block diagram showing an example of the control unit 20. Referring to FIG. 11, the control unit 20 includes an oscillation circuit 21 for generating high frequency low voltage (for example, 100 KHz and 5~12V) signal, an amplitude control circuit 22 for controlling the voltage amplitude of the signal supplied from the oscillation circuit 21 at an almost constant value, a current detection circuit 25 for detecting a transmission current due to the oscillation signal, an AC-DC conversion circuit 26 for converting the output of the current detection circuit 25 to a DC voltage, an amplifier 27 for amplifying the output of the AC-DC conversion circuit 26, the aforementioned connector 28 which is connected with the current detection circuit 25 and fixed on the housing of the control unit 20, a phase difference detection circuit 29 which is connected to the both ends of the current detection circuit 25 for detecting the phase difference between the oscillation signal from the oscillation circuit 21 and an output signal which is supplied to the antenna electrode 2, an amplifier 30 for amplifying the output of the phase difference detection circuit 29, a control circuit 31 including an MPU (MicroProcessor Unit) etc., a connector 32 which is fixed on the housing of the control unit 20 for being connected to an unshown car battery, and a power circuit 33 which is placed between the connector 32 and the control circuit 31 for generating a uniform DC power voltage (5V, for example) from the power derived from the car battery. The control circuit 31 of the control unit 20 is connected to an air bag unit 18. The single uniform DC power voltage generated by the power circuit 33 is utilized as the system power source for the circuits in the control unit 20 such as the control circuit 31.

The amplitude control circuit 22 includes, for example, an amplitude variation circuit 23 for varying and controlling the voltage amplitude of the oscillation signal and an amplitude detection circuit 24 for detecting the voltage amplitude of the oscillation signal. The amplitude variation circuit 23 includes, for example, an amplitude variation section 23a composed of a programmable gain amplifier (PGA). The amplitude detection circuit 24 includes, for example, an amplitude detection section 24a composed of an operational amplifier etc. for detecting the voltage amplitude of the oscillation signal, an AC-DC conversion circuit 24b for converting the output of the amplitude detection section 24a into a DC voltage, and an amplifier 24c for amplifying the output of the AC-DC conversion circuit 24b. The output of the amplifier 24c of the amplitude detection circuit 24 is supplied to the control circuit 31, and an amplitude control signal is supplied from the control circuit 31 to the amplitude variation section 23a of the amplitude variation circuit 23.

Figure 12:
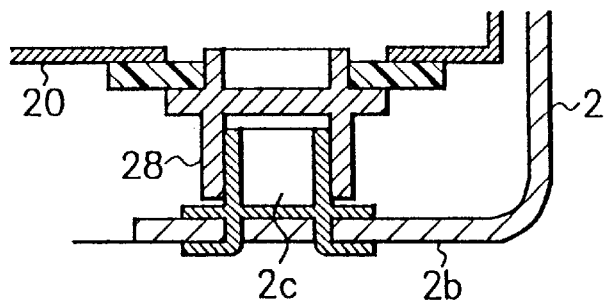
FIG. 12 is a vertical sectional view of a connector on the housing of he control unit of FIG. 11 and the connector of the antenna electrode of FIG. 10B which are coupled together.

The current detection circuit 25 includes, for example, an impedance device such as a resistor 25a which is inserted in series to the signal transmission circuit and an amplifier 25b for amplifying the terminal voltage of the resistor 25a. The output of the current detection circuit 25 is supplied to the control circuit 31 via the AC-DC conversion circuit 26 and the amplifier 27. The output end of the resistor 25a is connected to the connector 28 which is fixed on the housing of the control unit 20. FIG. 12 is a vertical sectional view of the connector 28 on the housing of the control unit 20 and the connector 2c of the antenna electrode 2 which are coupled together.

Figure 13A:
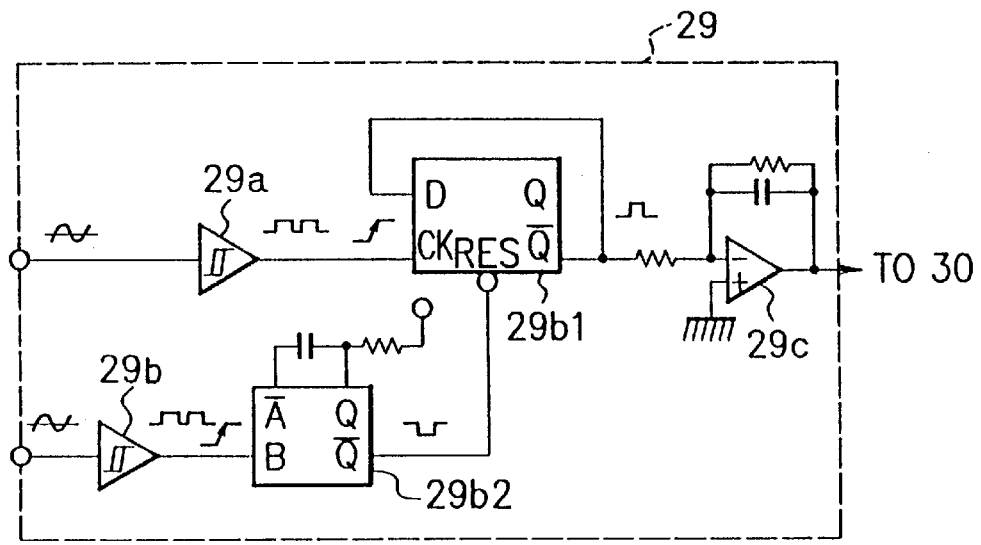
FIG. 13A is a circuit diagram showing an example of a phase difference detection circuit employed in the control unit of FIG. 11.
Figure 13B:
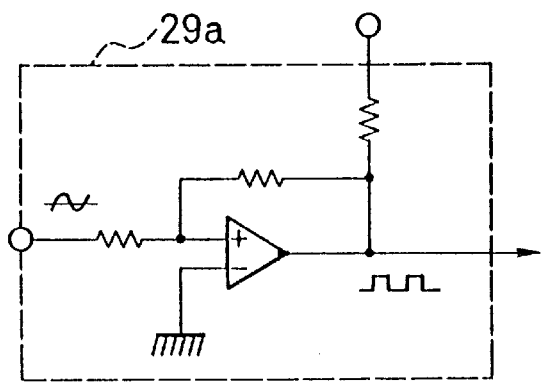
FIG. 13B is a circuit diagram showing an example of composition of a waveform shaping circuit employed in the phase difference detection circuit of FIG. 13A.

FIG. 13A is a circuit diagram showing an example of the phase difference detection circuit 29. Referring to FIG. 13A, the phase difference detection circuit 29 includes waveform shaping circuits 29a, a first flip-flop circuit 29b1, a second flip-flop circuit 29b2, and an integrator circuit 29c. FIG. 13B is a circuit diagram showing an example of composition of the waveform shaping circuit 29a. The waveform shaping circuit 29a transforms the waveform of an input signal (sine wave) into a square wave. The first flip-flop circuit 29b1 is supplied with the oscillation signal from the oscillation circuit 21 which has been transformed into a square wave by the waveform shaping circuit 29a, and the second flip-flop circuit 29b2 is supplied with the output signal to the antenna electrode 2 which has been transformed into a square wave by the waveform shaping circuit 29b.

Incidentally, in the case where the oscillation circuit 21 has capability of generating a high frequency low voltage square wave signal, the waveform shaping circuits 29a can be omitted, thereby composition of the control unit 20 can be simplified and cost for the system can be further reduced. In many cases, the control circuit 31 including an MPU has a function for outputting a high frequency low voltage square wave signal utilizing the uniform DC power voltage (5V, for example) supplied from the power circuit 33 and its clock signal, therefore, the control circuit 31 can also be utilized as the oscillation circuit 21 for generating the high frequency low voltage square wave signal. Here, the 'square wave signal' is not needed to be a perfect square wave as long as the phase difference detection circuit 29 without the waveform shaping circuits 29a can operate adequately.

In the following, the operation of the passenger detection system according to the embodiment of the present invention will be described.

First, a high frequency low voltage signal is generated by the oscillation circuit 21. The voltage amplitude of the signal is detected by the amplitude detection section 24a of the amplitude detection circuit 24, and the output of the amplitude detection section 24a is converted by the AC-DC conversion circuit 24b into a DC voltage, and the DC voltage is amplified by the amplifier 24c, and the amplified signal is supplied to the control circuit 31. The control circuit 31 judges whether the detected voltage amplitude is larger than the predetermined amplitude or smaller than the predetermined amplitude or equal to a predetermined amplitude, and outputs the amplitude control signal to the amplitude variation section 23a in order to modify the voltage amplitude to be equal to the predetermined amplitude. By the operation of the amplitude detection circuit 24 and the control circuit 31 and the amplitude variation circuit 23, the voltage amplitude of the oscillation signal is controlled to be equal to the predetermined fixed amplitude.

The oscillation signal whose voltage amplitude has been regulated to a fixed value is supplied to the antenna electrode 2 via the current detection circuit 25 and the connector 28, thereby a weak alternating electric field is generated around the antenna electrode 2. The amount of the transmission current which passes between the oscillation circuit 21 to the antenna electrode 2 varies depending on the distance between the dashboard DB (i.e. the antenna electrode 2) and the passenger P seated on the seat 1. The transmission current is detected by the current detection circuit 25, and the output of the current detection circuit 25 is converted by the AC-DC conversion circuit 26 into a DC voltage, and the DC voltage is amplified by the amplifier 27, and the amplified signal is supplied to the control circuit 31.

Figure 14A:
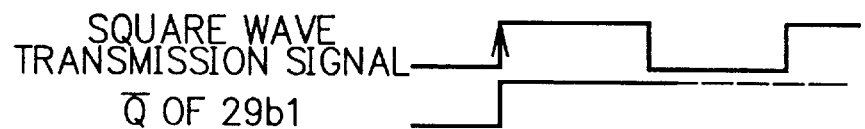
FIG. 14A through FIG. 14C are timing charts showing the operation of the phase difference detection circuit of FIG. 13A.
Figure 14B:
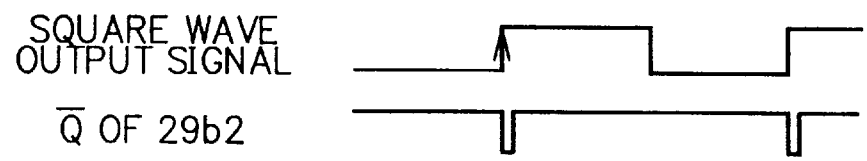
Figure 14C:
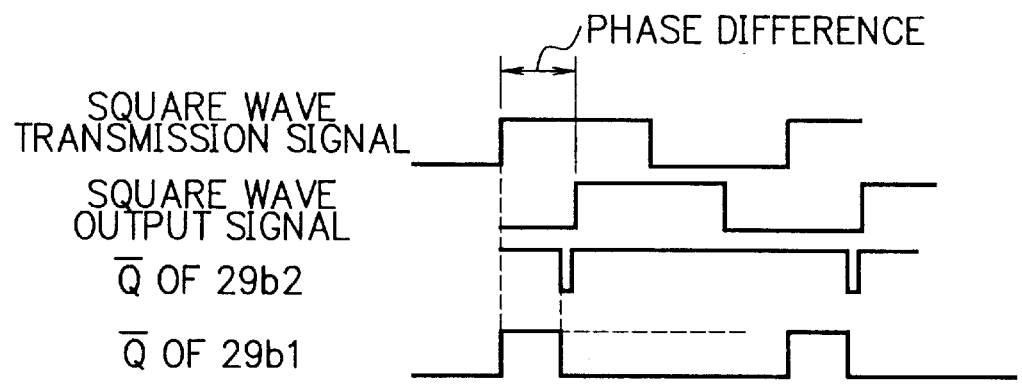

Meanwhile, signals (voltages) at both ends of the current detection circuit 25 (i.e. the oscillation signal on the side of the amplitude control circuit 22 supplied from the oscillation circuit 21 and the output signal on the side of the connector 28 which is supplied to the antenna electrode 2) are supplied to the phase difference detection circuit 29. The oscillation signal and the output signal which are in shapes of sign waves are transformed by the waveform shaping circuits 29a into square waves (hereafter, referred to as a square wave oscillation signal and a square wave output signal), and are supplied to the first flip-flop circuit 29b1 and the second flip-flop circuit 29b2 respectively. FIG. 14A through FIG. 14C are timing charts showing the operation of the phase difference detection circuit 29. When the square wave oscillation signal is supplied to the first flip-flop circuit 29b1, a rising edge of the square wave oscillation signal (indicated with an arrow) is detected by the clock terminal CK of the first flip-flop circuit 29b1 and the terminal Q-bar of the first flip-flop circuit 29b1 is turned into High as shown in FIG. 14A. On the other hand, the square wave output signal is supplied to the second flip-flop circuit 29b2 and rising edges of the square wave output signal are detected by the terminal B of the second flip-flop circuit 29b2. On every detection of the rising edge at the terminal B, the second flip-flop circuit 29b2 outputs a short Low signal from its terminal Q-bar as shown in FIG. 14B. The short Low signal is inputted to the reset terminal RES of the first flip-flop circuit 29b1, thereby the terminal Q-bar of the first flip-flop circuit 29b1 is reset into Low as shown in FIG. 14C. The (High) output of the terminal Q-bar of the first flip-flop circuit 29b1, representing the phase difference between the oscillation signal and the output signal, is converted into a voltage by the integrator circuit 29c, and the voltage is amplified by the amplifier 30, and the amplified voltage is supplied to the control circuit 31.

Figure 15:
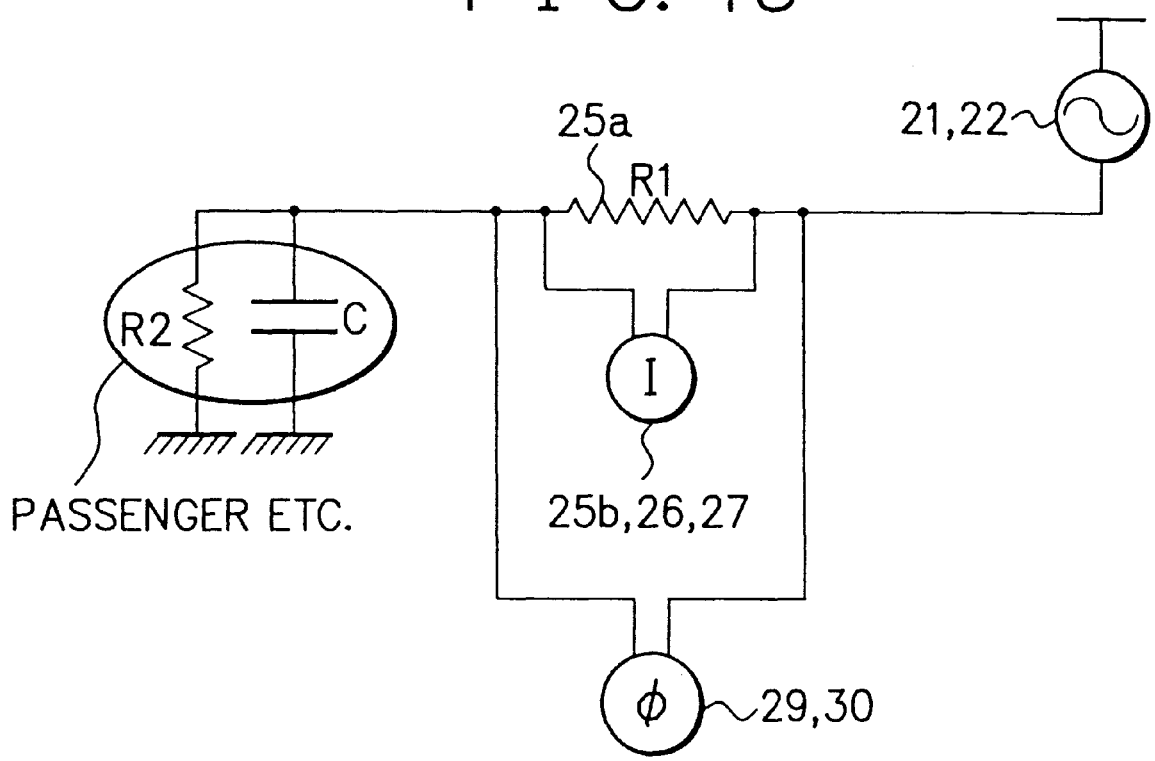
FIG. 15 is a circuit diagram explaining the principle behind the passenger detection system according to the present invention.
Figure 16C:
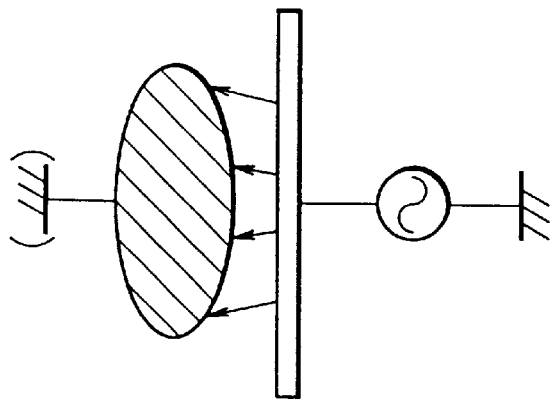
FIG. 16A through FIG. 16C are schematic diagrams explaining characteristics of a transmission current which passes between an oscillation circuit and an antenna electrode of the passenger detection system.
Figure 16B:
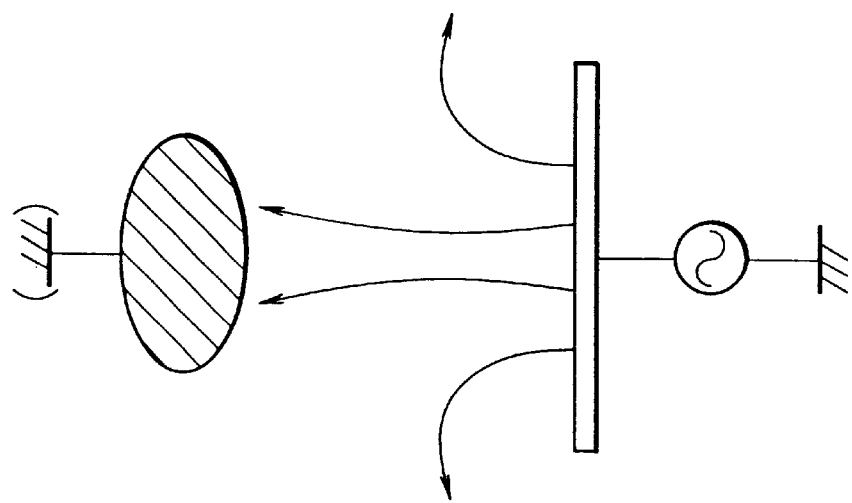
Figure 16A:
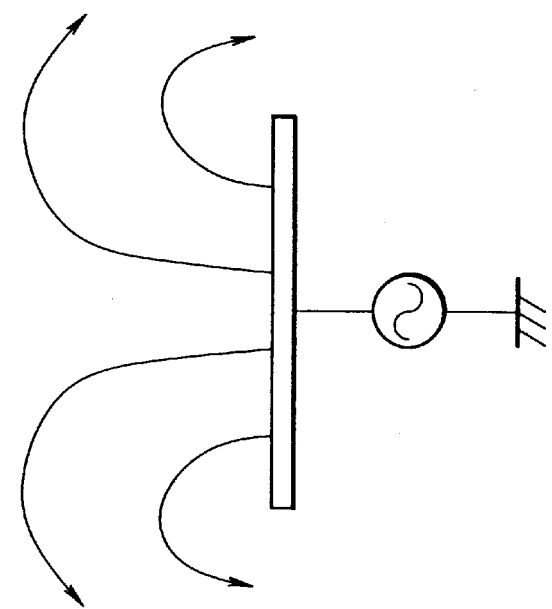
Figure 17:
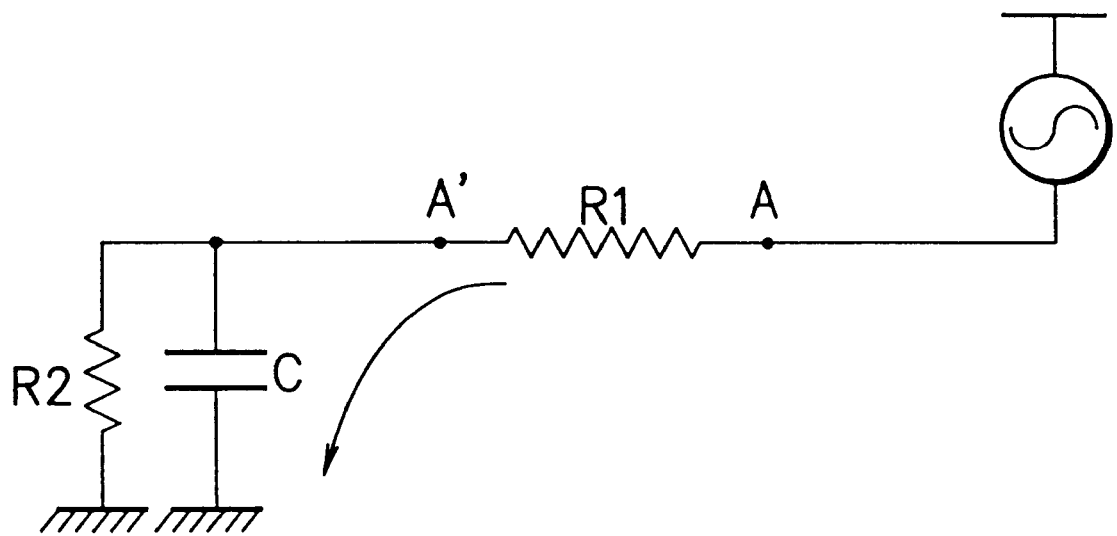
FIG. 17 is a schematic diagram explaining the phase difference between a transmission signal supplied from the oscillation circuit and an output signal supplied to the antenna electrode.

FIG. 15 is a circuit diagram explaining the principle behind the passenger detection system according to the present invention. The transmission current is detected by the current detection circuit 25 including the resistor 25a whose resistance is R1, and the phase difference is detected by the phase difference detection circuit 29 which is connected to both ends of the resistor 25a of the current detection circuit 25. As shown in FIG. 15, a passenger (, articles, air, etc.) can be represented by a resistance R2 and a capacitance C which connect the antenna electrode 2 and the ground. FIG. 16A through FIG. 16C are schematic diagrams explaining characteristics of the transmission current. When a passenger P is seated on the seat 1 as shown in FIG. 16B, the transmission current becomes larger than the case of FIG. 16A with no passenger, since permittivity of the passenger is larger than that of air. When the upper body (the face, for example) of the passenger P is close to the dashboard DB (i.e. the antenna electrode 2) as shown in FIG. 16C, the transmission current becomes larger than the case of FIG. 16B with the passenger P far from the dashboard DB. FIG. 17 is a schematic diagram explaining the phase difference. As mentioned above, the passenger can be represented by a resistance R2 and a capacitance C which connect the antenna electrode 2 and the ground. The resistance R1 of the resistor 25a and the capacitance C functions like a filter as shown in FIG. 17, and thus a phase difference occurs between the points A and A' on the ends of the resistance R1. Therefore, the phase difference with a passenger seated on the seat 1 becomes larger than that with nothing placed on the seat.

In the control circuit 31, a first threshold value concerning the transmission current which is measured by the current detection circuit 25 and a second threshold value concerning the phase difference (between the oscillation signal supplied to the current detection circuit 25 and the output signal supplied to the antenna electrode 2) which is measured by the phase difference detection circuit 29 are prestored.

According to the above-mentioned principle, the transmission current detected by the current detection circuit 25 takes on very large values in the case where a passenger P is close to the dashboard DB (the antenna electrode 2), and takes on large values in the case where passenger P is far from the dashboard DB, and takes on small values in the case where articles other than a passenger is placed on the seat 1 or nothing is placed on the seat 1. The transmission current becomes larger as the passenger P gets closer to the dashboard DB. The phase difference detected by the phase difference detection circuit 29 also takes on large values in the case where a passenger is seated on the seat 1, and takes on small values in the case where articles other than a passenger is placed on the seat 1 or nothing is placed on the seat 1. There exists obvious difference of the phase difference between the groups of values in the above two cases.

Therefore, the first threshold value concerning the transmission current can be set, for example, corresponding to a mean value of the transmission current (measured by the current detection circuit 25 and informed to the control circuit 31) when a passenger P is 20 cm from the dashboard DB (antenna electrode 2). The first threshold value concerning the transmission current can be used for judging whether or not the passenger P is at a distance less than 20 cm (the minimum allowable distance) from the dashboard DB.

The second threshold value concerning the phase difference can be set at a desired value between a larger mean value of the phase difference (measured by the phase difference detection circuit 29 and informed to the control circuit 31) when a passenger P is seated on the seat 1 and a smaller mean value of the phase difference (measured by the phase difference detection circuit 29 and informed to the control circuit 31) when articles other than a passenger are placed on the seat 1B or nothing is placed on the seat 1. The second threshold value concerning the phase difference can be used for judging whether or not the passenger P is seated on the seat 1.

By use of both threshold values concerning the transmission current and the phase difference, precise judgment of seating status on the seat 1 (whether or not a passenger P is seated on the seat 1, and whether or not the passenger P is at a distance less than the minimum allowable distance from the dashboard DB) can be executed.

Figure 8:
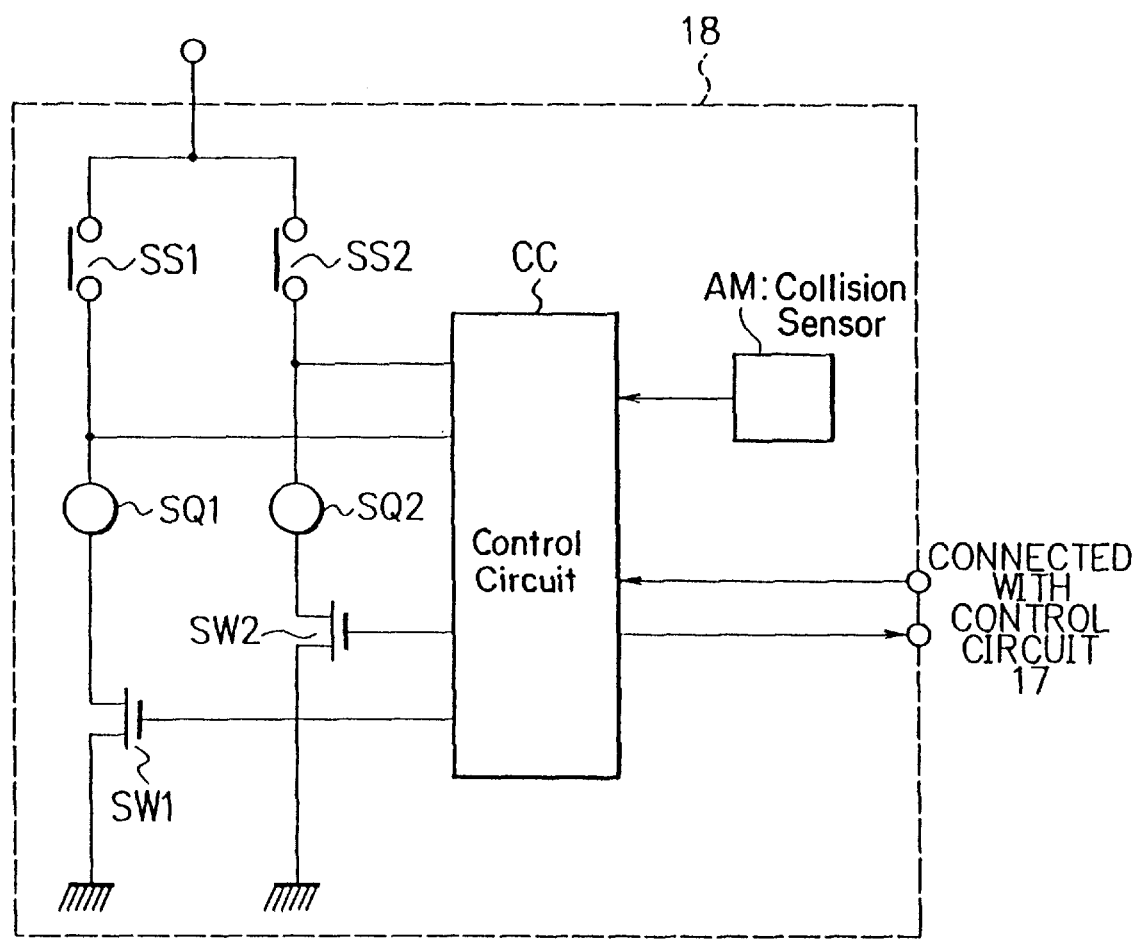
FIG. 8 is a circuit diagram showing an example of a circuit which is employed in an air bag unit which is connected with the passenger detection system of FIG. 6 and FIG. 7.
Figure 9:
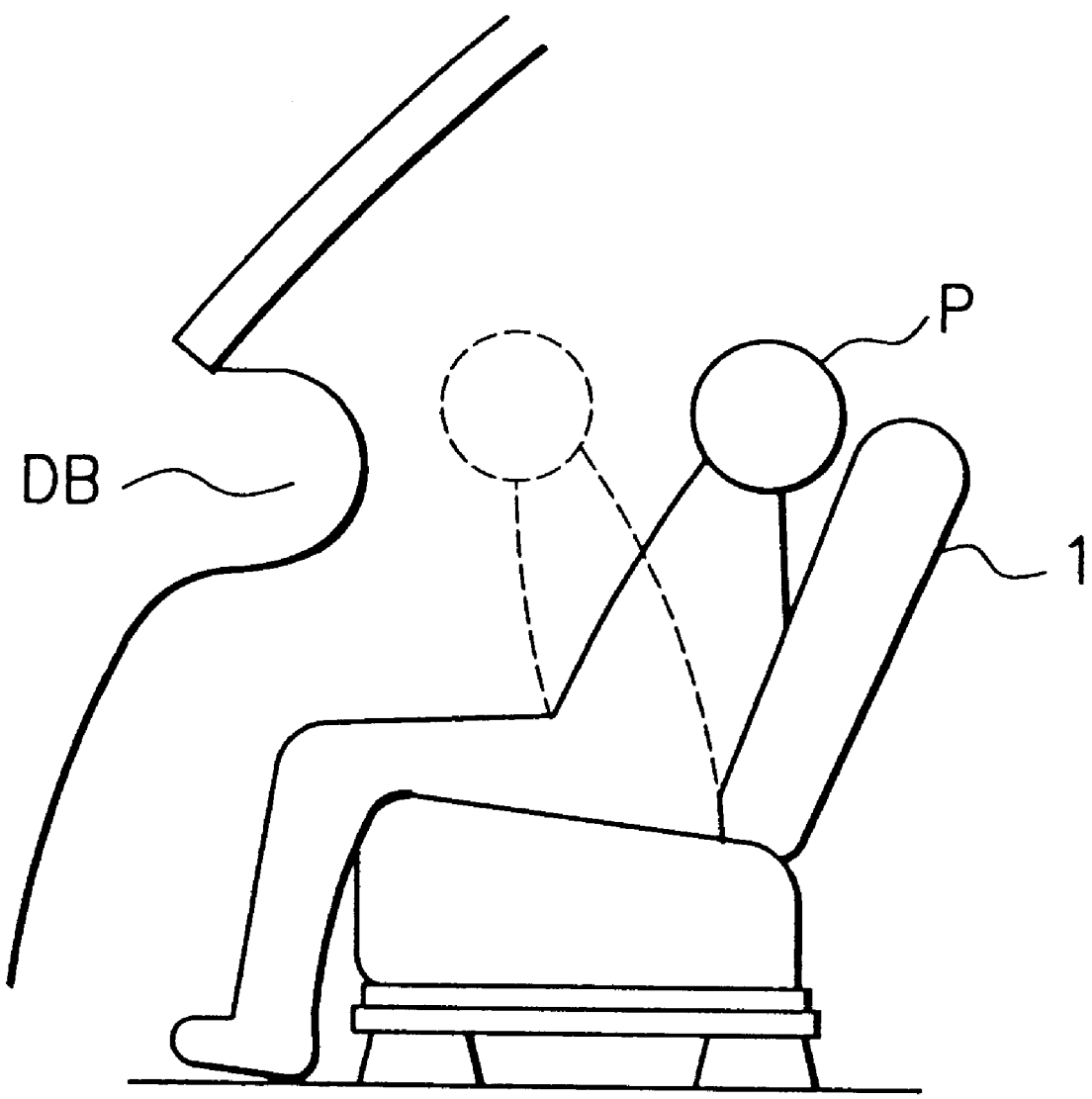
FIG. 9 is a schematic diagram explaining accidents which are occurring to passengers seated on the passenger seats.

In the case where the transmission current, which is measured by the current detection circuit 25 and informed to the control circuit 31, is smaller than the first threshold value concerning the transmission current, it is judged by the control circuit 31 that the distance between the dashboard DB and the passenger P is allowable (more than 20 cm, for example), therefore, the air bag unit 18 shown in FIG. 8 is set at a 'deployment mode' in which the control circuit CC deploys the air bag on the side of the passenger seat on collision, by a control signal sent from the control circuit 31. On the other hand, in the case where the transmission current is larger than or equal to the first threshold value concerning the transmission current, it is judged by the control circuit 31 that the distance between the dashboard DB and the passenger P is not allowable (not more than 20 cm, for example), therefore, the air bag unit 18 shown in FIG. 8 is set at a 'no deployment mode' in which the control circuit CC does not deploy the air bag on the side of the passenger seat on collision, by a control signal sent from the control circuit 31. Incidentally, the 'CONNECTED WITH CONTROL CIRCUIT 17' in FIG. 8 should be read as 'CONNECTED WITH CONTROL CIRCUIT 31' in this embodiment.

The control signals transmitted by the control circuit 31 are received by the control circuit CC of the air bag unit 18, and in the former case, the control circuit CC is set not to supply a gate signal to the semiconductor switching device SW2 on the side of the passenger seat on collision. Here, the semiconductor switching device SW1 on the side of the driver's seat is necessarily supplied with a gate signal on collision. In the latter case, the control circuit CC is set to supply gate signals to the semiconductor switching devices SW1 and SW2 on collision.

In the following, an example of a process in which the passenger detection system of the embodiment is operated in a car will be explained referring to FIG. 18 through FIG. 21.

Figure 18:
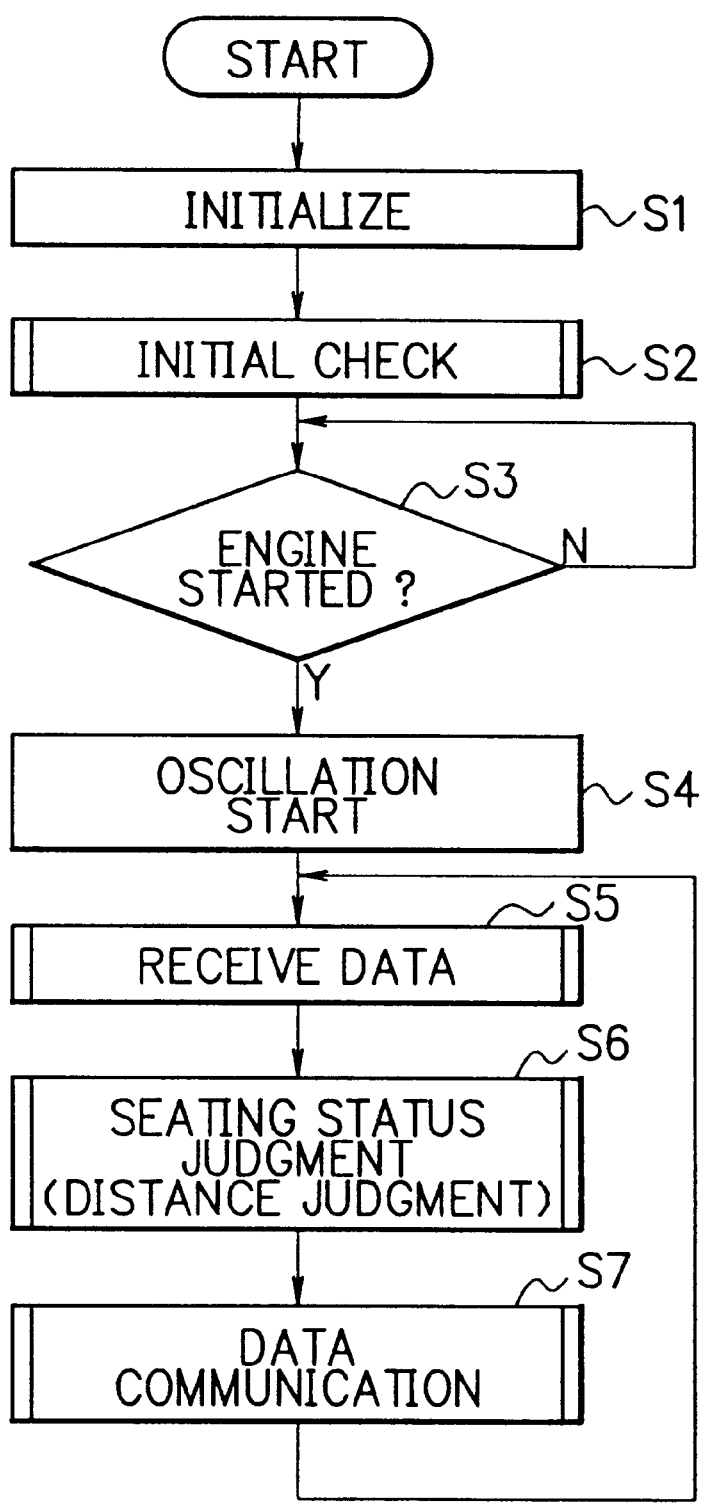
FIG. 18 is a flow chart showing an example of a process in which the passenger detection system of the embodiment is operated in a car.

Referring to FIG. 18, the process is started when the ignition switch of the car is turned ON. The air bag system is initialized in step S1. In step S2, the initial check of the communication system between the control circuit 31 and the air bag unit 18 is executed. In step S3, it is judged whether or not the engine of the car has already been started. The process proceeds to step S4 if the engine has already been started, and if else, the step S3 is repeated. In the step S4, oscillation by the oscillation circuit 21 is started and thereby a weak alternating electric field is generated around the antenna electrode 2. In step S5, data concerning the transmission current detected by the current detection circuit 25 and data concerning the phase difference detected by the phase difference detection circuit 29 are received by the control circuit 31. In step S6, judgment of the seating status on the seat 1 (whether or not a passenger P is seated on the seat 1, and whether or not the passenger P is at a distance less than the minimum allowable distance from the dashboard DB) is executed based on the data by the control circuit 31. In step S7, data communication according to the judgment result is executed between the control circuit 31 and the air bag unit 18. Thereafter, the process between the step S5 and the step S7 is repeated. Incidentally, it is also possible to omit the step S3.

Figure 19:
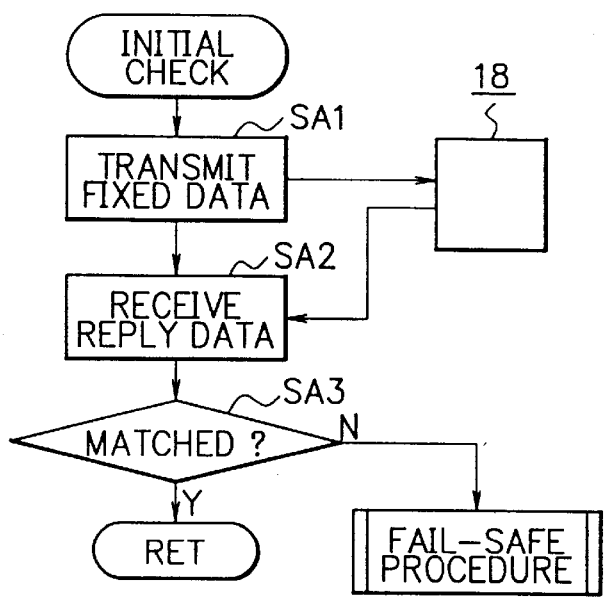
FIG. 19 is a flow chart showing an example of an initial check step in FIG. 18.

FIG. 19 is a flow chart showing an example of the initial check of the step S2 of FIG. 18. In step SA1, a fixed data is transmitted by the control circuit 31 to the control circuit CC of the air bag unit 18. In step SA2, a reply data transmitted by the control circuit CC of the air bag unit 18 is received by the control circuit 31. In step SA3, the control circuit 31 judges whether or not the reply data transmitted by the control circuit CC matches the fixed data transmitted to the control circuit CC. If matched, the initial check is finished and the process proceeds to the following steps of FIG. 18. If not matched, it is judged that failure exists in the communication system between the control circuit 31 and the air bag unit 18, and a fail-safe procedure such as illumination of a warning lamp is performed. Incidentally, although the initial check was executed in the above example by the control circuit 31 by transmitting the fixed data to the control circuit CC of the air bag unit 18 and receiving the reply data from the control circuit CC, it is also possible to let the control circuit CC of the air bag unit 18 execute the initial check by transmitting a fixed data to the control circuit 31 and receiving a reply data from the control circuit 31.

Figure 20:
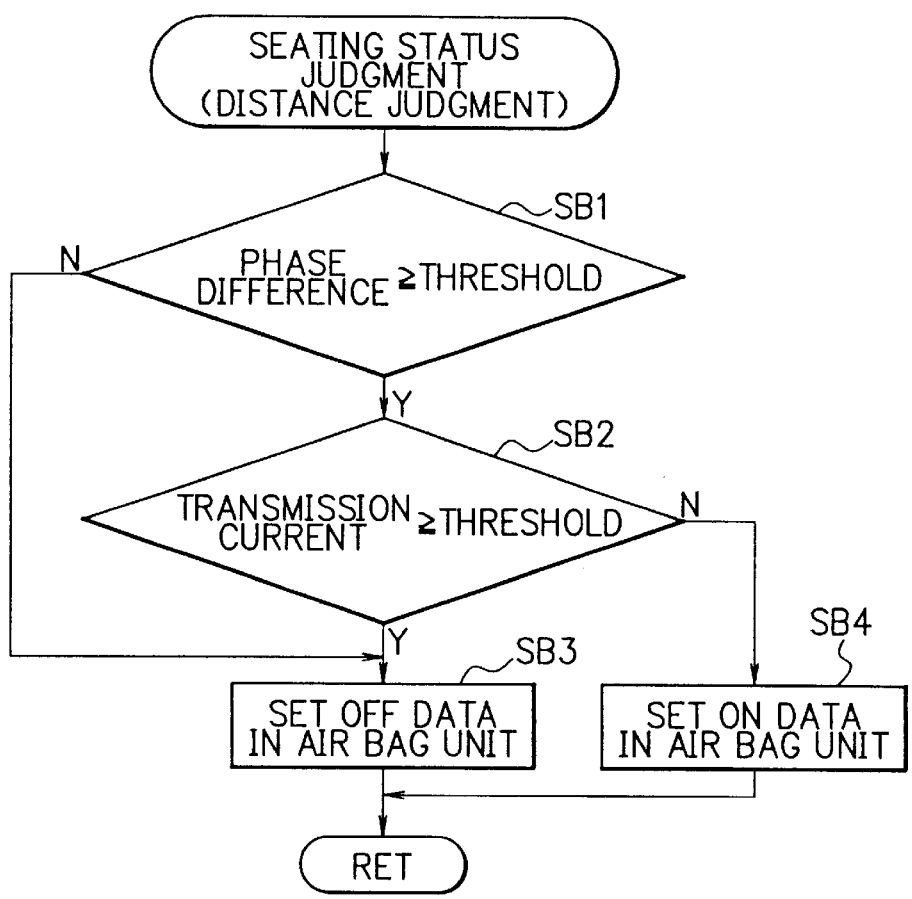
FIG. 20 is a flow chart showing an example of a seating status judgment (distance judgment) step in FIG. 18.

FIG. 20 is a flow chart showing an example of the seating status judgment (distance judgment) of the step S6 of FIG. 18. In step SB1, it is judged whether or not the data concerning the phase difference detected by the phase difference detection circuit 29 is larger than or equal to the second threshold value which is prestored in the control circuit 31. If the phase difference data is larger than or equal to the second threshold value (i.e. if a passenger P is seated on the seat 1), process proceeds to step SB2. If the phase difference data is smaller than the second threshold value (i.e. if no passenger P is seated on the seat 1), process proceeds to the step SB3. In the step SB2, it is judged whether or not the data concerning the transmission current detected by the current detection circuit 25 is larger than or equal to the first threshold value which is prestored in the control circuit 31. If the transmission current data is larger than or equal to the first threshold value (i.e. if the passenger P is at a distance equal to or less than 20 cm from the dashboard DB), process proceeds to step SB3. In the step SB3, OFF data for setting the air bag unit 18 at the no deployment mode is set in the control circuit CC of the air bag unit 18. If the transmission current data is smaller than the first threshold value (i.e. if the passenger P is at a distance larger than 20 cm from the dashboard DB) in the step SB2, process proceeds to step SB4, and ON data for setting the air bag unit 18 at the deployment mode is set in the control circuit CC of the air bag unit 18. After the step SB3 or the step SB4 is executed, process proceeds to the step S7 (data communication) of FIG. 18.

FIG. 21 is a flow chart showing an example of the data communication of the step S7 of FIG. 18. First, steps in the data communication executed by the control circuit 31 of the control unit 20 of the passenger detection system will be described. In step SC1, the ON data or the OFF data for setting the air bag unit 18 at the deployment mode or the no deployment mode and a check data are transmitted by the control circuit 31 of the passenger detection system to the control circuit CC of the air bag unit 18. In step SC2, an OK data or an NG data for responding to the ON data or the OFF data and the check data which have been transmitted by the control circuit CC are received by the control circuit 31. In step SC3, it is checked whether or not the ON/OFF data and the check data which have been transmitted by the control circuit 31 to the control circuit CC could be sent back to the control circuit 31 by the control circuit CC in perfect form. If the data sent back to the control circuit 31 were in perfect form (i.e. if the communication system between the control unit 20 and the air bag unit 18 has no failure), the data communication of the step S7 of FIG. 18 is ended and the process is returned to the step S5 of FIG. 18. If the data sent back to the control circuit 31 were not in perfect form (i.e. if the communication system between the control unit 20 and the air bag unit 18 has failure), process proceeds to step SC4 and it is judged whether or not a fail-safe counter of the control circuit 31 has come to zero. The initial value of the fail-safe counter of the control circuit 31 is set at 3, for example. Therefore, fail-safe procedure such as illumination of a warning lamp is performed when the failure of the communication system is detected three times (i.e. when the fail-safe counter comes to zero). If the fail-safe counter has not come to zero in the step SC4, process proceeds to step SC5 and the fail-safe counter is decremented, and the data communication of the step S7 of FIG. 18 is ended and the process is returned to the step S5 of FIG. 18.

Next, steps in the data communication executed by the control circuit CC of the air bag unit 18 will be described. In step SD1, the ON data or the OFF data for setting the air bag unit 18 at the deployment mode or the no deployment mode and the check data which have been transmitted by the control circuit 31 is received by the control circuit CC. In step SD2, the control circuit CC judges whether or not the ON/OFF data and the check data could be received in perfect form (i.e. whether or not the communication system between the control circuit 31 and the control circuit CC has no failure). If the communication system is judged to have no failure in the step SD2, the OK data and the check data are transmitted by the control circuit CC to the control circuit 31 in step SD3 and process proceeds to step SD4. In the step SD4, data in the control circuit CC of the air bag unit 18 is updated according to the ON/OFF data, and the air bag unit 18 is set at the deployment mode or the no deployment mode. If the communication system is judged to have failure in the step SD2, the NG data and the check data are transmitted by the control circuit CC to the control circuit 31 in the step SD3 and process proceeds to step SD5. In the step SD5, it is judged whether or not a fail-safe counter of the control circuit CC has come to zero. The initial value of the fail-safe counter of the control circuit CC is set at 3, for example. Therefore, fail-safe procedure such as illumination of a warning lamp is performed when the failure of the communication system is detected three times (i.e. when the fail-safe counter comes to zero). If the fail-safe counter has not come to zero in the step SD5, process proceeds to step SD6 and the fail-safe counter is decremented, and the data communication of the step S7 of FIG. 18 is ended and the process is returned to the step S5 of FIG. 18.

As described above, according to the embodiment, an antenna electrode 2 is provided to the dashboard DB which is facing the seat 1 on which a passenger P is seated, and a weak alternating electric field is generated around the antenna electrode 2, thereby a transmission current corresponding the distance between the dashboard DB and the passenger P (corresponding to the attitude of the passenger P seated on the seat 1) passes in the antenna electrode 2. The transmission current detected by the current detection circuit 25 becomes larger as the passenger P gets closer to the dashboard DB. Therefore, whether the distance between the dashboard DB and the passenger P is allowable or not can easily be judged by the transmission current which is detected by the current detection circuit 25.

Further, the phase difference between the oscillation signal on the input side of the current detection circuit 25 and the output signal on the output side of the current detection circuit 25 varies depending on what is placed on the seat 1, and the phase difference becomes especially large when a passenger is seated on the seat. There exists obvious difference of the amount of the phase difference between the case where a passenger P is seated on the seat 1 and other cases. Therefore, the presence or absence of a passenger P seated on the seat 1 can be judged by the phase difference which is detected by the phase difference detection circuit 29.

The air bag unit 18 is set at the deployment mode (in which the control circuit CC deploys the air bag on the side of the passenger seat on collision) or at the no deployment mode (in which the control circuit CC does not deploy the air bag on the side of the passenger seat on collision), according to the judgment on whether the distance between the dashboard DB and the passenger P is allowable or not based on the transmission current detected by the current detection circuit 25. When the distance between the dashboard DB and the passenger P is judged to be unallowable (less than 20 cm, for example), the air bag unit 18 is set at the no deployment mode, and the air bag on the side of the passenger seat is not deployed on collision with the passenger P close to the dashboard DB. Therefore, the passenger P who is close to the dashboard DB on collision does not get strong impact on the face by a rapidly expanding air bag, nor is punched back to the back section of the passenger seat strongly to get hurt on the face, head, neck, etc., thereby the passenger is protected from secondary injury due to deployment of the air bag. Incidentally, in such cases, the passenger P close to the dashboard DB is protected by the seatbelt.

There are cases where the air bag deploys with a slight collision of the car at a low speed. In such cases, the advantage of deployment of the airbag (protecting the passenger P from impact damage due to collision) is less than the disadvantage of deployment of the airbag (injury due to deployment of the air bag). The air bag unit 18 to which the passenger detection system according to the embodiment is applied is especially effective in such cases. Therefore, it is also possible to let the control circuit 31 of the passenger detection system determine whether the air bag unit 18 should be set at the deployment mode or the no deployment mode, in consideration of the speed of the car as well as the judgment based on the transmission current and the phase difference.

Figure 2A:
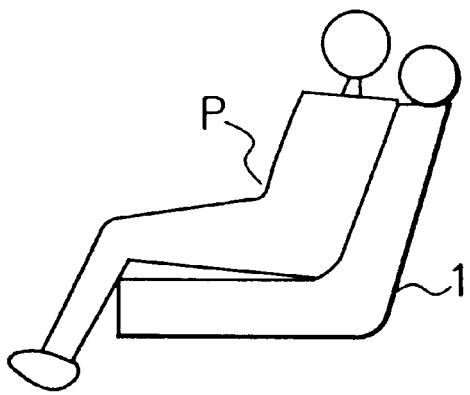
FIG. 2A through FIG. 2C are schematic diagrams showing statuses of a passenger on a passenger seat.
Figure 2B:
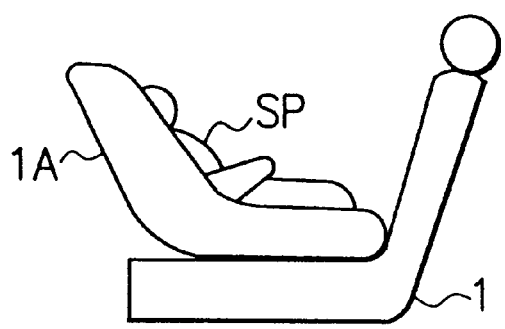
Figure 2C:
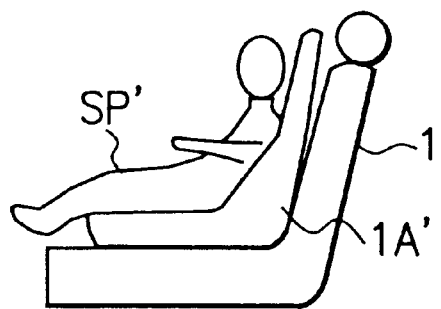
Figure 3:
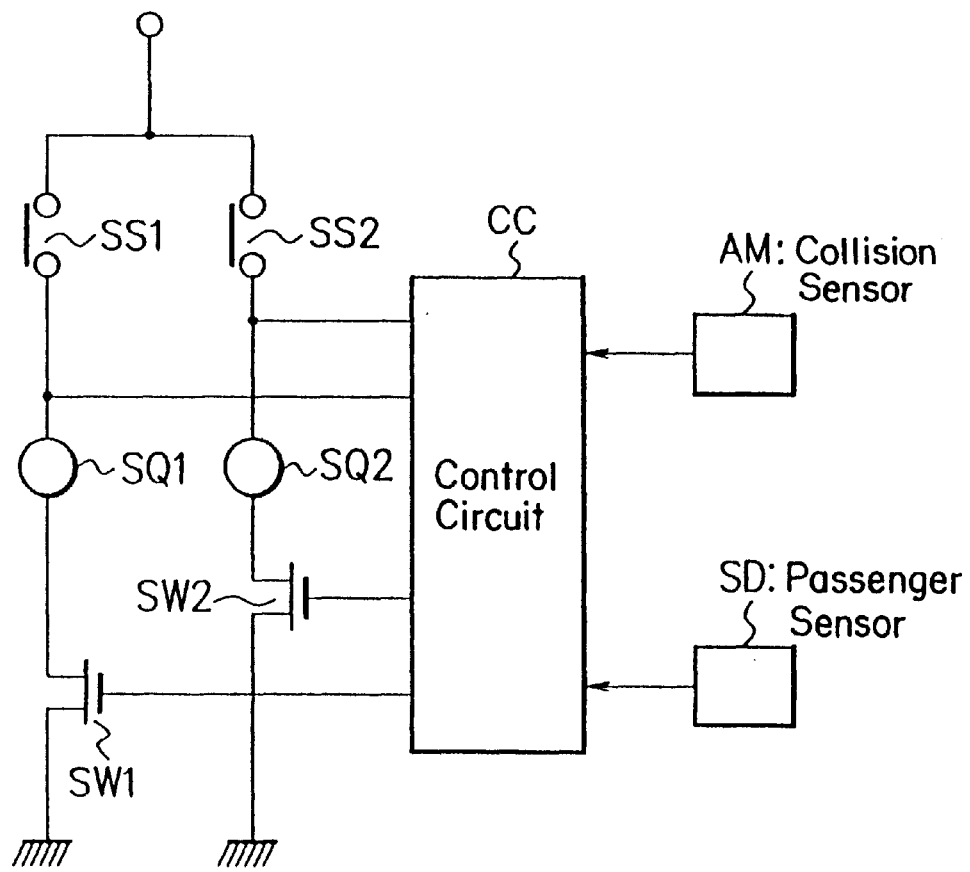
FIG. 3 is a circuit diagram showing another conventional circuit proposed for air bag systems.
Figure 4A:
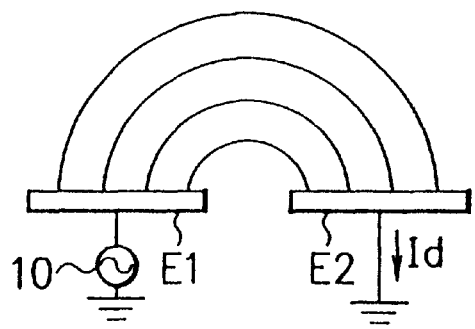
FIG. 4A and FIG. 4B are schematic diagrams showing the principles of a passenger detection system which has lately been proposed by the present inventors.
Figure 4B:
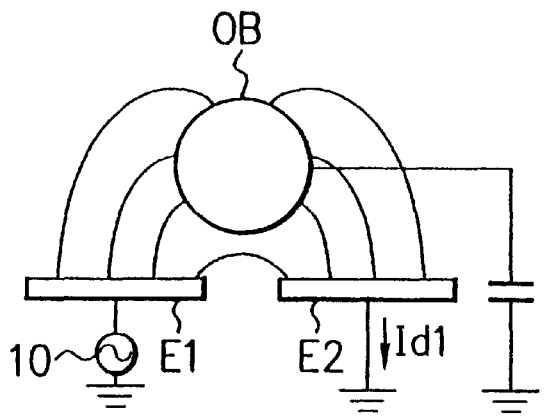
Figure 5:
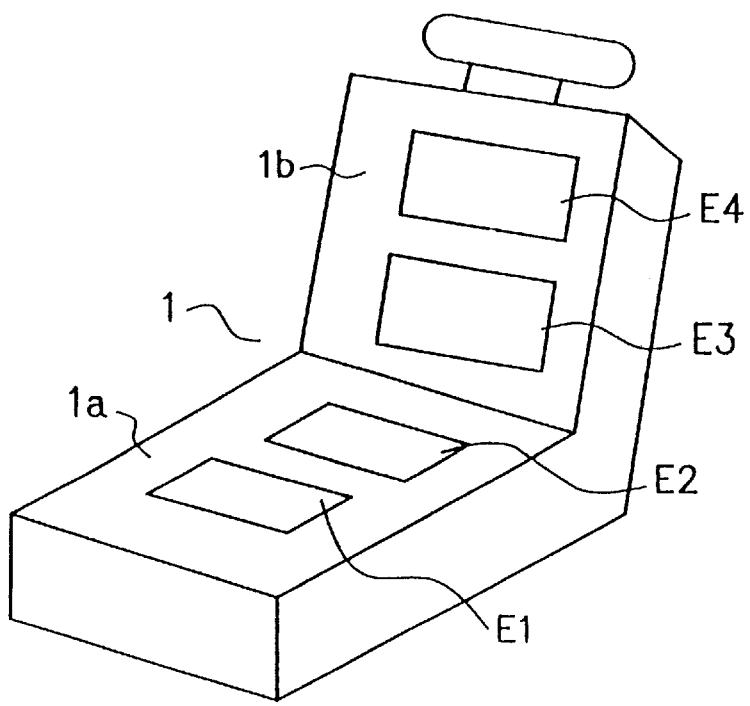
FIG. 5 is a perspective view of a passenger seat which is provided with the passenger detection system which has lately been proposed by the present inventors.
Figure 6:
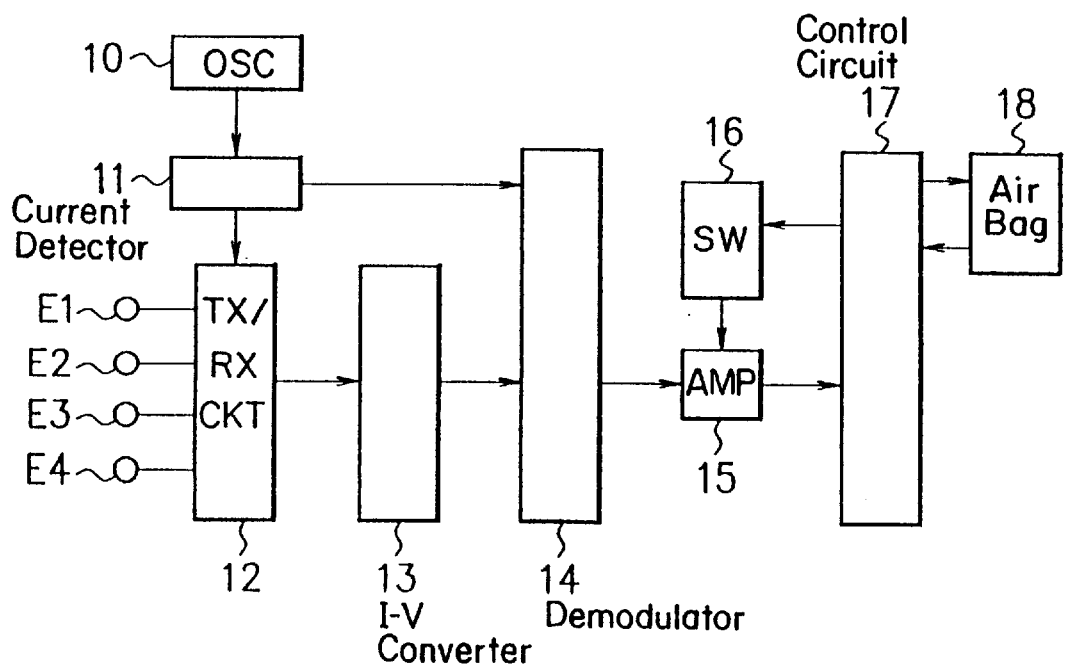
FIG. 6 is a circuit diagram showing the passenger detection system which has lately been proposed by the present inventors.
Figure 7:
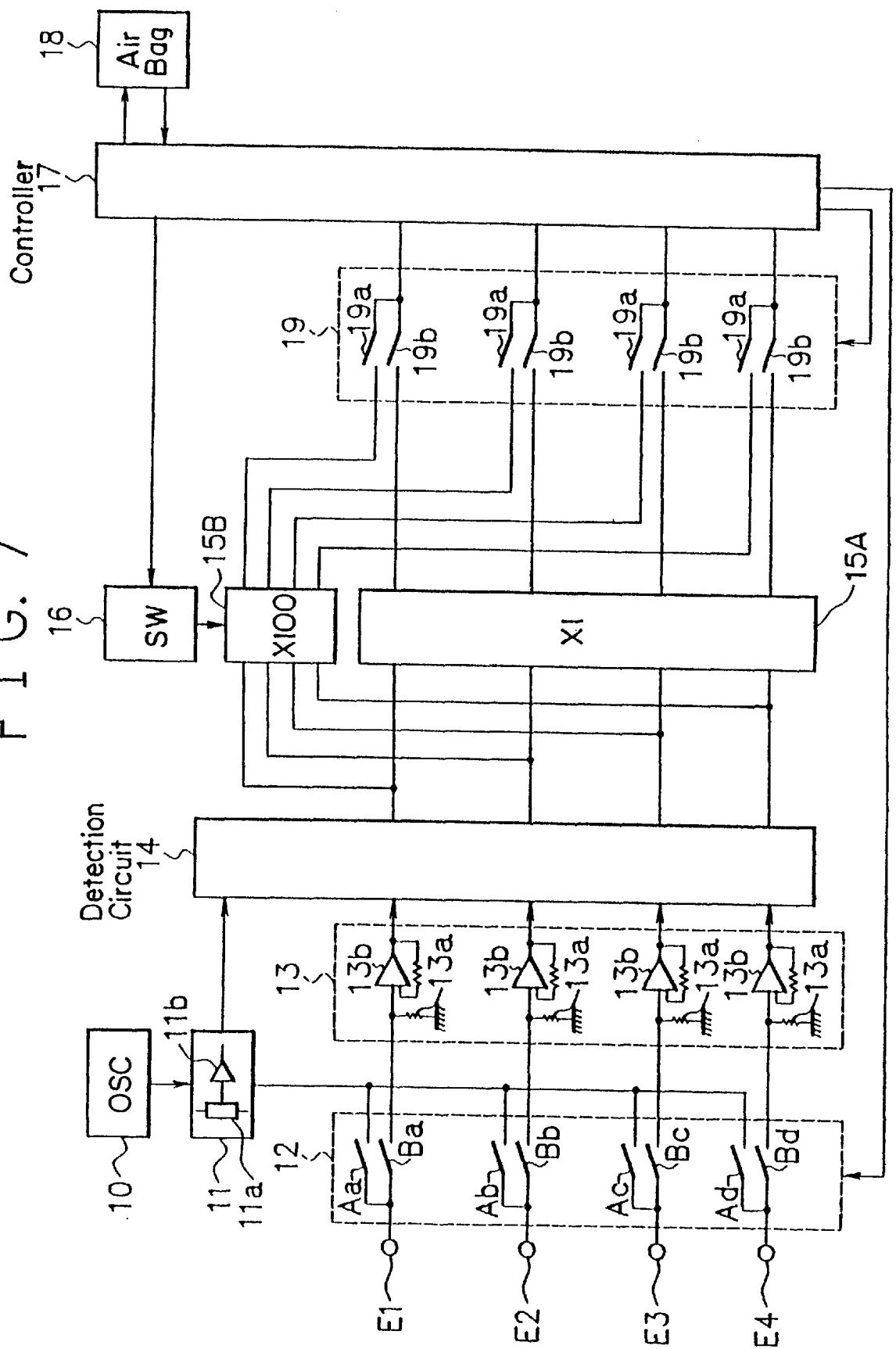
FIG. 7 is a circuit diagram showing more concrete details of FIG. 6.

Incidentally, the passengers P detected by the passenger detection system include children and infants, such as an infant SP who is seated on an infant seat 1A which is fixed on the passenger seat facing rear (the 'RFIS' (Rear Facing Infant Seat)) as shown in FIG. 2B. For example, when an infant SP is seated in RFIS, the infant SP is judged to be close to the dashboard DB and the air bag unit 18 is set at the no deployment mode, thereby the infant seat and the infant SP does not get strong impact by the rapidly expanding air bag on collision, nor punched to the back section of the seat 1 to get injured. In the case of children, a child who is light in weight and close to the dashboard DB tends to be strongly punched back by the rapidly expanding air bag to the back section of the seat 1 on collision, to get injured seriously. Therefore, the passenger detection system according to the present invention capable of setting the air bag unit 18 at the no deployment mode is also effective for children and infants.

Further, the antenna section 2a of the antenna electrode 2 is provided to the dashboard DB so that the area of the antenna section 2a facing part (especially, the face) of the passenger P will be as large as possible. Therefore, detection of the amount of the transmission current utilizing the passenger P as some kind of antenna can be executed precisely, thereby whether the distance between the dashboard DB and the passenger P is allowable or not can be judged correctly.

Especially, the passenger detection system according to the present invention needs only one antenna electrode, therefore circuit composition of the system can considerably be simplified compared to the passenger detection system needing a plurality of electrodes which have lately been proposed by the present inventors, and thus cost for the system can be considerably reduced.

By utilizing the single uniform DC power voltage generated by the power circuit 33 as the system power source for the circuits in the control unit 20 of the passenger detection system including the control circuit 31, circuit composition of the control unit 20 is further simplified, and thus cost for the system is further reduced.

By employing an oscillation circuit which generates a high frequency low voltage square wave signal, composition of the control unit can be further simplified, and thus cost for the system can be further reduced. The MPU included in the control circuit can also be utilized as the oscillation circuit for generating the high frequency low voltage square wave signal.

By use of the amplitude control circuit 22 for regulating voltage amplitude of the oscillation signal to a fixed value, variation of the voltage amplitude of the oscillation signal is avoided. Therefore, whether the distance between the dashboard DB and the passenger P is allowable or not can be judged with precision and reliability, only by simple comparison of the transmission current detected by the current detection circuit 25 with a threshold value which is stored in the control circuit 31.

While the present invention has been described with reference to the particular illustrative embodiments, it is not to be restricted by those embodiments but only by the appended claims. For example, the shape of the antenna electrode which is provided to the dashboard is not limited to a quadrangle which has been shown above, and the shape can be a circle, an ellipsoid, a polygon, etc. The oscillation frequency of the oscillation circuit can be set at other than 100 Khz according to the situation in the car, etc., and the output voltage of the oscillator circuit can also be varied adequately. It is also possible to omit the amplitude control circuit 22 depending on the quality of the system power source, and the phase difference detection circuit 29 can also be omitted depending on required function of the passenger detection system. For example, the passenger detection system according to the present invention without the phase difference detection circuit 29 can be used only for judging whether the distance between the dashboard and the passenger is allowable or not, with another passenger detection system for judging the presence or absence of a passenger on the seat (such as the passenger detection system which has lately been proposed by the present inventors). Further, application of the passenger detection system according to the present invention is not limited to front seats of cars. It is also possible to apply the passenger detection system according to the present invention to rear seats of cars or seats of other vehicles. In such cases, the antenna electrode 2 is provided to a portion of a vehicle in front of a seat of the vehicle so as to face a passenger seated on the seat (for example, the rear side of a driver's seat etc.). In addition, the passenger detection system according to the present invention can be used without the judgment with regard to the threshold values, that is, the passenger detection system according to the present invention can also be used simply for measuring the distance between a passenger and a portion of a vehicle to which the antenna electrode is provided. Therefore, the passenger detection system according to the present invention can also be applied to other use than the setting of the air bag system. It is to be appreciated that those skilled in the art can change or modify the embodiments without departing from the scope and spirit of the present invention.

What is claimed is:

1. A passenger detection system comprising:
   an antenna electrode which is provided to a portion of a vehicle located in front of a seat of a vehicle so as to face a passenger seated on the seat and generates an electric field between the antenna electrode and the passenger;
   an oscillation means electrically connected to the antenna electrode, said oscillation means generating a high frequency low voltage oscillation signal in order to generate a weak electric field around the antenna electrode;
   a current detection means for detecting a current which passes between the oscillation means and the antenna electrode depending on disturbance in the electric field between the antenna electrode and the passenger; and
   a judgment means for judging a distance between the passenger and the portion of the vehicle based on the current detected by the current detection means.

2. The passenger detection system as claimed in claim 1, wherein said electric field between the antenna electrode and the passenger has an electrical characteristic such that the passenger operates as an antenna for the electric field.

3. A passenger detection system as claimed in claim 1, wherein the antenna electrode comprises a flexible and conductive planar form attached to a passenger-side dashboard on a passenger-side of the vehicle and an area of the antenna electrode is disposed to face the passenger, and said flexible and conductive planar form of said antenna electrode covers a substantial portion of the passenger-side dashboard.

4. A passenger detection system comprising:
   an antenna electrode which is provided to a portion of a vehicle located in front of a seat of a vehicle so as to face a passenger seated on the seat;
   an oscillation means electrically connected to the antenna electrode, said oscillation means generating a high frequency low voltage oscillation signal in order to generate a weak electric field around the antenna electrode;
   a current detection means for detecting a current which passes between the oscillation means and the antenna electrode depending on a strength of the electric field which is generated around the antenna electrode;
   a judgment means for judging a distance between the passenger and the portion of the vehicle based on the current detected by the current detection means; and
   an amplitude control means for controlling a voltage amplitude of the oscillation signal which is supplied by the oscillation means to the antenna electrode to a substantially constant value.

5. A passenger detection system comprising:
   an antenna electrode which is provided to a portion of a vehicle located in front of a seat of the vehicle so as to face a passenger seated on the seat;
   an oscillation means electrically connected to the antenna electrode, said oscillation means generating a high frequency low voltage oscillation signal in order to generate a weak electric field around the antenna electrode;
   a current detection means for detecting a current which passes between the oscillation means and the antenna electrode depending on a strength of the weak electric field which is generated around the antenna electrode;

a phase difference detection means for detecting a phase difference between the oscillation signal supplied from the oscillation means and an output signal which is supplied to the antenna electrode by the generated weak electric field; and a judgment means for judging a presence or absence of a passenger seated on the seat based on the phase difference detected by the phase difference detection means and producing a passenger presence indicating signal and judging a distance between the passenger and the portion of the vehicle based on the current detected by the current detection means.

6. A passenger detection system as claimed in claim 5, wherein the passenger detection system is connected with an air bag unit which is capable of deploying an air bag in front of the passenger in case of collision, said passenger detection system and said air bag unit being connected by a data line to transmit the passenger presence indicating signal from the passenger detection system to the air bag unit, the air bag unit including a controller receiving the passenger presence indicating signal to set the air bag unit to a deployment mode in which the air bag unit deploys the air bag upon collision or to a no deployment mode in which the air bag unit does not deploy the air bag upon collision according to the passenger presence indicating signal.

7. A passenger detection system as claimed in claim 6, wherein the judgment means executes judgment on the presence or absence of a passenger seated on the seat by comparing the phase difference detected by the phase difference detection means with a prestored threshold value concerning the phase difference and executes judgment on whether the distance between the passenger and the portion of the vehicle is more than a minimum allowable distance or less than the minimum allowable distance by comparing the current detected by the current detection means with another prestored threshold value concerning a current corresponding to the minimum allowable distance, and the controller sets the air bag unit at the no deployment mode if it is judged that no passenger is seated on the seat or the distance is less than the minimum allowable distance.

8. A passenger detection system as claimed in claim 7, wherein the antenna electrode is provided to a dashboard of a car.

9. A passenger detection system as claimed in claim 8, wherein a detection control unit is made up by enclosing the oscillation means, the current detection means, the phase difference detection means and the judgment means in a common housing, and the detection control unit is placed inside or near the dashboard.

10. A passenger detection system as claimed in claim 5, wherein the antenna electrode comprises a flexible and conductive planar form attached to a passenger-side dashboard on a passenger-side of the vehicle and an area of the antenna electrode is disposed to face the passenger, and said flexible and conductive planar form of said antenna electrode covers a substantial portion of the passenger-side dashboard.

11. A passenger detection system as claimed in claim 5, further comprising an amplitude control means for controlling a voltage amplitude of the oscillation signal which is supplied by the oscillation means to the antenna electrode to a substantially constant value.

12. A passenger detection system as claimed in claim 5, further comprising a power circuit for generating a single uniform DC voltage utilizing power derived from a battery, in which the single uniform DC voltage supplied by the power circuit is utilized as a system power source for the oscillation means, the current detection means, the phase difference detection means and the judgment means.

13. A passenger detection system as claimed in claim 5, wherein the phase difference detection means is connected a first end of the current detection means and a second end of the current detection means and detects a phase difference between signals of the first and second ends of the current detection means.

14. A passenger detection system as claimed in claim 5, wherein the phase difference detection means detects the phase difference between the oscillation signal and an output signal of the antenna electrode, by detecting a phase difference between a rising/falling edge of a square wave signal corresponding to the oscillation signal and a rising/falling edge of a square wave signal corresponding to the output signal.

15. A passenger detection system as claimed in claim 5, wherein the oscillation means generates the high frequency low voltage oscillation signal substantially in the form of a square wave.

16. A passenger detection system as claimed in claim 15, wherein an MPU (MicroProcessor Unit) generates the high frequency low voltage oscillation signal in the form of a square wave.

17. A passenger detection method comprising the steps of:

a field generation step in which a weak electric field is generated by supplying an oscillating signal to an antenna electrode which is provided to a portion of a vehicle located in front of a seat of the vehicle so as to face a passenger seated on the seat;

detecting a current output by the antenna electrode depending on a strength of the weak electric field;

detecting a phase difference between the oscillation signal an output signal which is supplied to the antenna electrode; and a judgment step in which a presence or absence of a passenger seated on the seat is judged based on the phase difference which has been detected in the phase difference detecting step and the distance between the passenger and the portion of the vehicle is judged based on the current which has been detected in the current detecting step.

18. A passenger detection method as claimed in claim 17, further comprising the steps of:

a data communication step in which distance data obtained in the judgment step is sent to an air bag unit; and an air bag unit setting step in which the air bag unit is set at a deployment mode in which the air bag unit deploys the air bag upon collision according to the distance data.

19. A passenger detection method as claimed in claim 18, wherein in the judgment step, the presence or absence of a passenger seated on the seat is judged by comparing a phase difference detected in the phase difference detecting step with a prestored threshold value concerning the phase difference and whether the distance between the passenger and the portion of the vehicle is more than a minimum allowable distance or less than the minimum allowable distance is judged by comparing the current detected in the current detecting step with another threshold value concerning a current corresponding to the minimum allowable distance, and in the air bag unit setting step, the air bag unit is set at the no deployment mode if it is judged that no passenger is seated on the seat or the distance is less than the minimum allowable distance.

20. A passenger detection method as claimed in claim 19, wherein the antenna electrode is provided to a dashboard of a car.

21. A passenger detection method as claimed in claim 17, wherein in the phase difference detecting step, the phase difference between the oscillation signal and the output signal of the antenna electrode is detected by detecting a phase difference between a rising/falling edge of a square wave signal corresponding to the oscillation signal and a rising/falling edge of a square wave signal corresponding to the output signal.

22. A passenger detection method as claimed in claim 17, wherein the oscillation signal comprises a high frequency low voltage square wave oscillation signal.

23. A passenger detection method as claimed in claim 22, wherein an MPU (MicroProcessor Unit) generates the high frequency low voltage square wave oscillation signal.

24. A passenger detection system comprising:

an antenna electrode which is provided to a portion of a vehicle located in front of a seat of a vehicle so as to face a passenger seated on the seat;

an oscillation means electrically connected to the antenna electrode, said oscillation means generating a high frequency low voltage oscillation signal in order to generate a weak electric field around the antenna electrode;

a phase difference detection means for detecting a phase difference between the oscillation signal supplied from the oscillation means and an output signal which is supplied to the antenna electrode by the generated weak electric field; and a judgment means for judging a presence or absence of a passenger seated on the seat based on the phase difference detected by the phase difference detection means.

25. A passenger detection method comprising steps of:

a field generation step in which a weak electric field is generated by supplying an oscillating signal to an antenna electrode which is provided to a portion of vehicle located in front of a seat of the vehicle so as to face a passenger seated on the seat;

detecting a phase difference between the oscillation signal and output signal which is supplied to the antenna electrode; and a judgment step in which a presence or an absence of a passenger seated on a seat is judged based on the phase difference which has been detected in the phase difference detecting step.

* * * * *